US010691659B2

(12) United States Patent
Blumenau et al.

(10) Patent No.: US 10,691,659 B2
(45) Date of Patent: Jun. 23, 2020

(54) INTEGRATING COPY DATA TOKENS WITH SOURCE CODE REPOSITORIES

(71) Applicant: Actifio, Inc., Waltham, MA (US)

(72) Inventors: Steven M. Blumenau, Holliston, MA (US); James Sullivan, Wellesley, MA (US); Christopher Murphy, Lakeville, MA (US)

(73) Assignee: Actifio, Inc., Waltham, MA (US)

( * ) Notice: Subject to any disclaimer, the term of this patent is extended or adjusted under 35 U.S.C. 154(b) by 628 days.

(21) Appl. No.: 14/789,360

(22) Filed: Jul. 1, 2015

(65) Prior Publication Data

US 2017/0004154 A1    Jan. 5, 2017

(51) Int. Cl.
| | |
|---|---|
| G06F 17/00 | (2019.01) |
| G06F 16/21 | (2019.01) |
| G06F 8/71 | (2018.01) |
| G06F 21/33 | (2013.01) |
| G06F 21/10 | (2013.01) |
| G06F 16/178 | (2019.01) |

(52) U.S. Cl.
CPC ............ *G06F 16/219* (2019.01); *G06F 8/71* (2013.01); *G06F 16/178* (2019.01); *G06F 21/10* (2013.01); *G06F 21/335* (2013.01)

(58) Field of Classification Search
CPC ......... G06F 17/30309; G06F 17/30174; G06F 16/219; G06F 16/178
USPC ....................................................... 707/695
See application file for complete search history.

(56) References Cited

U.S. PATENT DOCUMENTS

| | | | |
|---|---|---|---|
| 4,626,829 | A | 12/1986 | Hauck |
| 5,381,545 | A | 1/1995 | Baker et al. |
| 5,410,667 | A | 4/1995 | Belsan et al. |
| 5,497,483 | A | 3/1996 | Beardsley et al. |
| 5,535,381 | A | 7/1996 | Kopper |
| 5,819,292 | A | 10/1998 | Hitz et al. |
| 5,828,876 | A | 10/1998 | Fish et al. |
| 5,857,208 | A | 1/1999 | Ofek |
| 5,963,962 | A | 10/1999 | Hitz et al. |

(Continued)

OTHER PUBLICATIONS

Alapati, "NetApp Technical Report: SnapMirror Sync and SnapMirror Semi-Sync Overview and Design Considerations," NetApp, Jul. 2010 (24 pages).

(Continued)

*Primary Examiner* — Mark E Hershley
(74) *Attorney, Agent, or Firm* — Wilmer Cutler Pickering Hale and Dorr LLP

(57) ABSTRACT

Computerized systems and methods are provided for integrating copy data tokens with source code repositories. A first command associated with the version control system stores in the memory a copy of source code and a copy of the data token from the remote repository, comprising source data and mount data. A second command associated with the version control system is executed to create a version of the source code stored in the memory. Based on the execution of the second command a working copy of the copy data is created based on the data token for use with the version of the source code, comprising creating a copy of the copy data from the data source based on the source data, and mounting the working copy to the device based on the mount data, thereby automatically managing the copy data for the version control system.

19 Claims, 22 Drawing Sheets

(56) References Cited

U.S. PATENT DOCUMENTS

| | | | |
|---|---|---|---|
| 6,065,018 | A | 5/2000 | Beier et al. |
| 6,081,875 | A | 6/2000 | Clifton et al. |
| 6,088,693 | A * | 7/2000 | Van Huben .......... G06F 16/2343 |
| 6,119,208 | A | 9/2000 | White et al. |
| 6,131,148 | A | 10/2000 | West et al. |
| 6,148,412 | A | 11/2000 | Cannon et al. |
| 6,163,856 | A | 12/2000 | Dion et al. |
| 6,192,444 | B1 | 2/2001 | White et al. |
| 6,199,146 | B1 | 3/2001 | Pence |
| 6,202,071 | B1 | 3/2001 | Keene |
| 6,212,531 | B1 | 4/2001 | Blea et al. |
| 6,226,759 | B1 | 5/2001 | Miller et al. |
| 6,269,381 | B1 | 7/2001 | St Pierre et al. |
| 6,269,431 | B1 | 7/2001 | Dunham |
| 6,324,548 | B1 | 11/2001 | Sorenson |
| 6,330,614 | B1 | 12/2001 | Aggarwal et al. |
| 6,434,681 | B1 | 8/2002 | Armangau |
| 6,460,055 | B1 | 10/2002 | Midgley et al. |
| 6,484,186 | B1 | 11/2002 | Rungta |
| 6,487,561 | B1 | 11/2002 | Ofek et al. |
| 6,557,089 | B1 | 4/2003 | Reed et al. |
| 6,625,704 | B2 | 9/2003 | Winokur |
| 6,654,772 | B1 | 11/2003 | Crow et al. |
| 6,654,912 | B1 | 11/2003 | Viswanathan et al. |
| 6,665,815 | B1 | 12/2003 | Goldstein et al. |
| 6,668,264 | B1 | 12/2003 | Patterson et al. |
| 6,772,302 | B1 | 8/2004 | Thompson |
| 6,779,094 | B2 | 8/2004 | Selkirk et al. |
| 6,823,336 | B1 | 11/2004 | Srinivasan et al. |
| 6,823,436 | B2 | 11/2004 | Krishnamurthy |
| 6,850,929 | B2 | 2/2005 | Chang et al. |
| 6,898,688 | B2 | 5/2005 | Martin et al. |
| 6,915,397 | B2 | 7/2005 | Lubbers et al. |
| 6,928,526 | B1 | 8/2005 | Zhu et al. |
| 6,948,039 | B2 | 9/2005 | Biessener et al. |
| 6,957,362 | B2 | 10/2005 | Armangau |
| 7,072,916 | B1 | 7/2006 | Lewis et al. |
| 7,143,251 | B1 | 11/2006 | Patterson |
| 7,222,194 | B2 | 5/2007 | Kano et al. |
| 7,325,111 | B1 | 1/2008 | Jiang |
| 7,346,623 | B2 | 3/2008 | Prahlad et al. |
| 7,386,695 | B2 | 6/2008 | Fuente |
| 7,428,657 | B2 | 9/2008 | Yamasaki |
| 7,483,871 | B2 * | 1/2009 | Herz ...................... G06Q 30/02 |
| 7,647,355 | B2 | 1/2010 | Best et al. |
| 7,689,633 | B1 | 3/2010 | Li et al. |
| 7,707,184 | B1 | 4/2010 | Zhang et al. |
| 7,814,128 | B2 | 10/2010 | Silvers et al. |
| 7,937,547 | B2 | 5/2011 | Liu et al. |
| 8,037,032 | B2 | 10/2011 | Pershin et al. |
| 8,139,575 | B2 | 3/2012 | Biran et al. |
| 8,150,808 | B2 | 4/2012 | Zha et al. |
| 8,166,026 | B1 * | 4/2012 | Sadler ................... G06F 16/951 707/725 |
| 8,180,740 | B1 | 5/2012 | Stager et al. |
| 8,180,742 | B2 | 5/2012 | Claudatos et al. |
| 8,296,179 | B1 * | 10/2012 | Rennison ........... G06Q 30/0251 705/14.53 |
| 8,299,944 | B2 | 10/2012 | Provenzano |
| 8,407,191 | B1 | 3/2013 | Nanda |
| 8,706,833 | B1 | 4/2014 | Bergant et al. |
| 8,788,769 | B2 | 7/2014 | Abercrombie et al. |
| 8,924,269 | B2 * | 12/2014 | Seubert ................... G06Q 10/06 705/35 |
| 9,098,432 | B1 | 8/2015 | Bachu et al. |
| 2002/0129214 | A1 | 9/2002 | Sarkar |
| 2003/0101321 | A1 | 5/2003 | Ohran |
| 2003/0140070 | A1 | 7/2003 | Kaczmarski et al. |
| 2003/0145281 | A1 * | 7/2003 | Thames .................... G06F 8/71 715/205 |
| 2003/0227487 | A1 * | 12/2003 | Hugh .................. G06F 16/9024 715/777 |
| 2004/0199570 | A1 | 10/2004 | Terao |
| 2005/0066095 | A1 | 3/2005 | Mullick et al. |
| 2005/0165794 | A1 | 7/2005 | Mosescu |
| 2006/0074945 | A1 | 4/2006 | Mori |
| 2006/0085738 | A1 | 4/2006 | Chapus et al. |
| 2006/0122946 | A1 | 6/2006 | Fahrny et al. |
| 2006/0224521 | A1 | 10/2006 | Lakamp et al. |
| 2007/0294756 | A1 | 12/2007 | Fetik |
| 2008/0270151 | A1 * | 10/2008 | Mahoney ............... G06Q 30/02 705/1.1 |
| 2008/0288644 | A1 | 11/2008 | Gilfix et al. |
| 2009/0164929 | A1 * | 6/2009 | Chen .................. G06F 16/9535 715/769 |
| 2009/0222496 | A1 | 9/2009 | Liu et al. |
| 2011/0119361 | A1 | 5/2011 | Issa et al. |
| 2011/0258161 | A1 | 10/2011 | Constantinescu et al. |
| 2012/0183938 | A1 | 7/2012 | Hilton et al. |
| 2012/0317145 | A1 * | 12/2012 | Reghetti ............. G06F 21/6209 707/781 |
| 2013/0124538 | A1 * | 5/2013 | Lee ...................... H04L 63/105 707/749 |
| 2013/0262387 | A1 * | 10/2013 | Varadharajan ...... G06F 11/3664 707/639 |
| 2013/0262638 | A1 * | 10/2013 | Kumarasamy ........ G06F 15/177 709/221 |
| 2014/0108803 | A1 | 4/2014 | Probert |
| 2014/0283120 | A1 | 9/2014 | Mao et al. |
| 2015/0143064 | A1 * | 5/2015 | Bhargava ............ G06F 11/1451 711/162 |
| 2015/0172120 | A1 * | 6/2015 | Dwarampudi ............ G06F 3/06 709/221 |
| 2015/0261768 | A1 | 9/2015 | Ahn et al. |
| 2016/0124958 | A1 * | 5/2016 | Sinha .................. G06F 16/9535 707/733 |

OTHER PUBLICATIONS

American Megatrends, Inc., "StorTrends/ManageTrends (Version 2.7) User's Guide for the StorTends 1300 Storage Appliance" Mar. 23, 2009 (378 pages).

Arrell et al., "Using RVA and SnapShot for Business Intelligence Applications with OS/390 and DB2," IBM, Redbooks, Aug. 1998 (70 pages).

Azagury et al., "Point-in-Time Copy: Yesterday, Today and Tomorrow," IBM Research Lab in Haifa, No Date Listed (pgs. 259-270).

Baird, "Virtual Storage Architecture Guide (VSAG)," IEEE, No Month Listed 1995 (pp. 312-326).

Baker, "Disk-Based Mirroring Is a Lot More Than Just Safe," Computer Technology Review, No Month Listed 2000 (pp. 55-57).

Cederqvist et al., "Version Management with CVS," No Month Listed 1992 (122 pages).

Chang et al., "Performance Analysis of Two Frozen Image Based Backup/Restore Methods," IEEE International Conference on Electron Information Technology 2005, May 22-25, 2005 (7 pages).

Chapman et al., "SnapMirror® Best Practices Guide," Network Appliance, Inc., Apr. 2006 (63 pages).

Chatterjee et al., "Efficient Replication Leveraging Information Lifecycle Management in Data Storage Systems," Provisional Patent Application No. Not Available, Feb. 9, 2009 (25 pages).

Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 1998 (17 pages).

Chutani et al., "The Episode File System," Usenix Association, Proceedings of the Winter 1992 Usenix Conference, San Francisco, California, Jan. 20-24, 1992 (19 pages).

CommVault, "CommVault® Simpana® Quick Recovery® Software for Critical Data Center Applications and File Systems," No Month Listed 2010 (35 pages).

Dantz Development Corporation, "Retrospect® User's Guide," No Month Listed 2002 (262 pages).

Degwekar, "Using SnapMirror® with SnapDrive® for Unix®," No Month Listed 2007 (11 pages).

Delphix Corp.'s Invalidity Contentions Under Patent L.R. 3-3, Jul. 24, 2014 (27 pages).

(56) References Cited

OTHER PUBLICATIONS

Edwards et al., "FlexVol: Flexible, Efficient File vol. Virtualization in WAFL," Usenix Association, Usenix '08: 2008 Usenix Annual Technical Conference, No Month Listed 2008 (pp. 129-142).
You et al., "Deep Store:Aan Archival Storage System Architecture," Proceedings of the 21st International Conference on Data Engineering, No Month Listed 2005 (12 pages).
Zhang et al., "yFS: A Journaling File System Design for Handling Large Data Sets with Reduced Seeking," Usenix Association, Proceedings of Fast '03: 2nd Usenix Conference on File and Storage Technologies, San Francisco, California, Mar. 31-Apr. 2, 2003 (15 pages).
EMC, "Backup of Oracle in EMC Symmetrix Environments with EMC NetWorker PowerSnap," Aug. 2008 (25 pages).
Zhu et al., "Avoiding the Disk Bottleneck in the Data Domain Deduplication File System," Proceedings of the 6th Usenix Conference on File and Storage Technologies Fast 2008, San Jose, California, No Month Listed 2008 (14 pages).
EMC, "EMC Celerra Version 5.6 Technical Primer: SLA-Driven Replication with Celerra Replicator (V2): Technology Concepts and Business Considerations," Jul. 2008 (20 pages).
EMC, "EMC DL1500 and DL3000 with EMC NetWorker: Best Practices Planning," Jul. 2009 (36 pages).
EMC, "Next-Generation Backup-to-Disk: Building the Foundation for Effective Operational Recovery Management," Jan. 31, 2005 (9 pages).
EMC, "Unified Backup and Recovery with EMC NetWorker," Mar. 2010 (16 pages).
Exhibit 1004 IPR2015-01689, Declaration of Ellie Young, Aug. 5, 2015 (24 pages).
Exhibit 1006 IPR2015-01678, Pfaffenberger, Webster's New World Computer Dictionary Ninth Edition, Hungry Minds, Inc., New York, New York, No Month Listed 2001 (4 pages).
Exhibit 1006 IPR2015-01689, File History for U.S. Appl. No. 12/947,393, dated Apr. 14, 2015 (108 pages).
Exhibit 1006v2 IPR2015-01689, Version 2, File History for U.S. Appl. No. 12/947,393, No Date Listed (177 pages).
Exhibit 1006v3 IPR2015-01689, Version 3, File History for U.S. Appl. No. 12/947,393, No Date Listed (150 pages).
Exhibit 1006v4 IPR2015-01689, Version 4, File History for U.S. Appl. No. 12/947,393, No Date Listed (98 pages).
Exhibit 1007 IPR2015-01678, Microsoft Computer Dictionary Fourth Edition, Microsoft Press, Redmond, Washington, No Month Listed 1999 (3 pages).
Exhibit 1007 IPR2015-01689, Declaration of Prashant Shenoy, Ph.D. In Support of Petition for Inter Partes Review, Aug. 5, 2015 (82 pages).
Exhibit 1008 IPR2015-01678, File History for U.S. Appl. No. 12/947,438, Apr. 14, 2015 (100 pages).
Exhibit 1008v2 IPR2015-01678, Version 2, File History for U.S. Appl. No. 12/947,438, No Date Listed (103 pages).
Exhibit 1009 IPR2015-01678, Declaration of Prashant Shenoy, Ph.D. In Support of Petition for Inter Partes Review, Aug. 5, 2015 (58 pages).
Exhibit 1010 IPR2015-01678, Rivest, "The MD5 Message-Digest Algorithm," retrieved online at [URL:<<https://www.ietf.org/rfc/rfc1321.txt>>] Apr. 1992 (20 pages).
Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 1995 (24 pages).
Exhibit A-01 to Delphix Corp.'s Preliminary Invalidity and Non-Infringement Contentions, "Data Domain ("Data Domain") as Prior Art to U.S. Pat. No. 6,732,244," Jul. 3, 2015 (7 pages).
Exhibit A-02 to Delphix Corp.'s Preliminary Invalidity and Non-Infringement Contentions, "Symantec NetBackupNeritas NetBackup ("NetBackup") as Prior Art to U.S. Pat. No. 6,732,244," Jul. 3, 2015 (7 pages).

Exhibit A-03 to Delphix Corp.'s Preliminary Invalidity and Non-Infringement Contentions, "Hitachi ShadowImage ("ShadowImage") as Prior Art to U.S. Pat. No. 6,732,244," Jul. 3, 2015 (7 pages).
Exhibit A-04 to Delphix Corp.'s Preliminary Invalidity and Non-Infringement Contentions, "U.S. Pat. No. 6,269,431 as Prior Art to U.S. Pat. No. 6,732,244," Jul. 3, 2015 (27 pages).
Exhibit A-05 to Delphix Corp.'s Preliminary Invalidity and Non-Infringement Contentions, "U.S. Pat. No. 6,915,397 ("the '397 patent") as Prior Art to U.S. Pat. No. 6,732,244," Jul. 3, 2015 (44 pages).
Exhibit A-06 to Delphix Corp.'s Preliminary Invalidity and Non-Infringement Contentions, "Hutchinson as Claim Chart for U.S. Pat. No. 6,732,244," Jul. 3, 2015 (64 pages).
Exhibit A-07 to Delphix Corp.'s Preliminary Invalidity and Non-Infringement Contentions, "Petal: Distributed Virtual Disks (Lee) as Prior Art to U.S. Pat. No. 6,732,244," Jul. 3, 2015 (35 pages).
Exhibit A-08 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-09 to Delphix Corp.'s Preliminary Invalidity and Non-Infringement Contentions, "U.S. Pat. No. 6,434,681 as Prior Art to U.S. Pat. No. 6,732,244," Jul. 3, 2015 (19 pages).
Exhibit A-10 to Delphix Corp.'s Preliminary Invalidity and Non-Infringement Contentions, "U.S. Pat. No. 7,072,916 ("the '916 patent") as Prior Art to U.S. Pat. No. 6,732,244," Jul. 3, 2015 (65 pages).
Exhibit A-11 to Delphix Corp.'s Preliminary Invalidity and Non-Infringement Contentions, "U.S. Pat. No. 6,898,688 as Prior Art to U.S. Pat. No. 6,732,244," Jul. 3, 2015 (35 pages).
Exhibit A-12 to Delphix Corp.'s Preliminary Invalidity and Non-Infringement Contentions, "Chervenak as Prior Art to U.S. Pat. No. 6,732,244," Jul. 3, 2015 (21 pages).
Exhibit A-13 to Delphix Corp.'s Preliminary Invalidity and Non-Infringement Contentions, "IBM Adstar Distributed Storage Manager ("ADSM")/Tivoli Storage Manager as Prior Art to U.S. Pat. No. 6,732,244," Jul. 3, 2015 (52 pages).
Exhibit A-14 to Delphix Corp.'s Preliminary Invalidity and Non-Infringement Contentions, "Green, Designing a Fast On-line Backup System for a Log-structured File System as Prior Art to U.S. Pat. No. 6,732,244," Jul. 3, 2015 (80 pages).
Exhibit A-15 to Delphix Corp.'s Preliminary Invalidity and Non-Infringement Contentions, "U.S. Pat. No. 5,535,381 as Prior Art to U.S. Pat. No. 6,732,244," Jul. 3, 2015 (53 pages).
Exhibit A-16 to Delphix Corp.'s Preliminary Invalidity and Non-Infringement Contentions, "IBM RAMAC Virtual Array ("RAMAC" or "RVA") as Prior Art to U.S. Pat. No. 6,732,244," Jul. 3, 2015 (68 pages).
Exhibit A-17 to Delphix Corp.'s Preliminary Invalidity and Non-Infringement Contentions, "The Episode File System ("Episode") as Prior Art to U.S. Pat. No. 6,732,244," Jul. 3, 2015 (21 pages).
Exhibit A-18 to Delphix Corp.'s Preliminary Invalidity and Non-Infringement Contentions, "Informix Storage Manager and Database Servers ("Informix") as Prior Art to U.S. Pat. No. 6,732,244," Jul. 3, 2015 (34 pages).
Exhibit A-19 to Delphix Corp.'s Preliminary Invalidity and Non-Infringement Contentions, "U.S. Pat. No. 6,779,094 ("the '094 patent") as Prior Art to U.S. Pat. No. 6,732,244," Jul. 3, 2015 (44 pages).
Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," Jul. 3, 2015 (59 pages).
Exhibit A-21 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-22 to Delphix Corp.'s Preliminary Invalidity and Non-Infringement Contentions, "Retrospect as Prior Art to U.S. Pat. No. 6,732,244," Jul. 3, 2015 (12 pages).
Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," Jul. 3, 2015 (25 pages).

(56) References Cited

OTHER PUBLICATIONS

Exhibit B-01 to Delphix Corp.'s Preliminary Invalidity and Non-Infringement Contentions, "Data Domain ("Data Domain") as Prior Art to U.S. Pat. No. 6,959,369," Jul. 3, 2015 (10 pages).
Exhibit B-02 to Delphix Corp.'s Preliminary Invalidity and Non-Infringement Contentions, "Hitachi ShadowImage ("ShadowImage") as Prior Art to U.S. Pat. No. 6,959,369," Jul. 3, 2015 (10 pages).
Exhibit B-03 to Delphix Corp.'s Preliminary Invalidity and Non-Infringement Contentions, "U.S. Pat. No. 6,269,431 as Prior Art to U.S. Pat. No. 6,959,369," Jul. 3, 2015 (42 pages).
Exhibit B-04 to Delphix Corp.'s Preliminary Invalidity and Non-Infringement Contentions, "Green, Designing a Fast On-line Backup System for a Log-structured File System as Prior Art to U.S. Pat. No. 6,959,369," Jul. 3, 2015 (104 pages).
Exhibit B-05 to Delphix Corp.'s Preliminary Invalidity and Non-Infringement Contentions, "U.S. Pat. No. 5,535,381 as Prior Art to U.S. Pat. No. 6,959,369," Jul. 3, 2015 (84 pages).
Exhibit B-06 to Delphix Corp.'s Preliminary Invalidity and Non-Infringement Contentions, "Hutchinson as Claim Chart for U.S. Pat. No. 6,959,369," Jul. 3, 2015 (80 pages).
Exhibit B-07 to Delphix Corp.'s Preliminary Invalidity and Non-Infringement Contentions, "U.S. Patent Application No. 2003/0140070 ("the '070 application") as Prior Art to U.S. Pat. No. 6,959,369," Jul. 3, 2015 (67 pages).
Exhibit B-08 to Delphix Corp.'s Preliminary Invalidity and Non-Infringement Contentions, "U.S. Pat. No. 6,898,688 as Prior Art to U.S. Pat. No. 6,959,369," Jul. 3, 2015 (53 pages).
Exhibit B-09 to Delphix Corp.'s Preliminary Invalidity and Non-Infringement Contentions, "U.S. Pat. No. 6,434,681 as Prior Art to U.S. Pat. No. 6,959,369," Jul. 3, 2015 (44 pages).
Exhibit B-10 to Delphix Corp.'s Preliminary Invalidity and Non-Infringement Contentions, "U.S. Pat. No. 7,072,916 ("the '916 patent") as Prior Art to U.S. Pat. No. 6,959,369," Jul. 3, 2015 (59 pages).
Exhibit B-11 to Delphix Corp.'s Preliminary Invalidity and Non-Infringement Contentions, "Chervenak as Prior Art to U.S. Pat. No. 6,959,369," Jul. 3, 2015 (69 pages).
Exhibit B-12 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,959,369," Jul. 3, 2015 (54 pages).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," Jul. 3, 2015 (51 pages).
Exhibit B-14 to Delphix Corp.'s Preliminary Invalidity and Non-Infringement Contentions, "U.S. Pat. No. 6,915,397 ("The '397 patent") as Prior Art to U.S. Pat. No. 6,959,369," Jul. 3, 2015 (94 pages).
Exhibit B-15 to Delphix Corp.'s Preliminary Invalidity and Non-Infringement Contentions, "IBM RAMAC Virtual Array ("RAMAC" or "RVA") as Prior Art to U.S. Pat. No. 6,959,369," Jul. 3, 2015 (89 pages).
Exhibit B-16 to Delphix Corp.'s Preliminary Invalidity and Non-Infringement Contentions, "Symantec NetBackupNeritas NetBackup ("NetBackup") as Prior Art to U.S. Pat. No. 6,959,369," Jul. 3, 2015 (65 pages).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," Jul. 3, 2015 (92 pages).
Exhibit B-18 to Delphix Corp.'s Preliminary Invalidity and Non-Infringement Contentions, "Retrospect as Prior Art to U.S. Pat. No. 6,959,369," Jul. 3, 2015 (35 pages).
Exhibit B-19 to Delphix Corp.'s Preliminary Invalidity and Non-Infringement Contentions, "EMC TimeFinder as Prior Art to U.S. Pat. No. 6,959,369," Jul. 3, 2015 (90 pages).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," Jul. 3, 2015 (70 pages).
Exhibit B-21 to Delphix Corp.'s Preliminary Invalidity and Non-Infringement Contentions, "NetApp Data Protection Solution ("NetApp") as Prior Art to U.S. Pat. No. 6,959,369," Jul. 3, 2015 (58 pages).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," Jul. 3, 2015 (43 pages).
Friess et al., "Windows NT Backup and Recovery with ADSM," IBM, Redbooks, May 1998 (190 pages).
Galli, "Journal File Systems in Linux," Upgrade the European Online Magazine for the IT Professional, vol. 2, No. 6, Dec. 2001 (8 pages).
Garrett et al., "Syncsort Backup Express and NetApp: Advances Data Protection and Disaster Recovery," Enterprise Strategy Group, Jan. 2009 (19 pages).
Gordon, "High Noon-Backup and Recovery: What Works, What Doesn't and Why," Enterprise Systems Journal, vol. 15, No. 9, Sep. 2000 (5 pages).
Green et al., "Designing a Fast, On-Line Backup System for a Log-Structured File System," Digital Technical Journal, vol. 8, No. 2, No Month Listed 1996 (pp. 32-45).
Gu et al., "DB2 UDB Backup and Recovery with ESS Copy Services," IBM, Redbooks, Aug. 2002 (144 pages).
Hendricks et al., "Improving Small File Performance in Object-Based Storage," Parallel Data Laboratory, Carnegie Mellon University, Pittsburgh, Pennsylvania, May 2006 (21 pages).
Herrin et al., "The Viva File System," retrieved online at [Url:<<http://www.cs.wisc.edu/~shankarViva/viva.html>>] Jun. 14, 1997 (26 pages).
Heyt et al., "Tivoli Storage Manager Version 3.7: Technical Guide," IBM, Redbooks, Dec. 1999 (248 pages).
Hitz et al., "File System Design for an NFS File Server Appliance," Network Appliance, Jan. 19, 1994 (23 pages).
Holton et al., "XFS: A Next Generation Journalled 64-Bit Filesystem with Guaranteed Rate I/O," retrieved online at [URL:<<http://www.sgi.com/Technology/xfs-whitepaper.html>>] Jun. 5, 1997 (15 pages).
Hutchinson, "Logical vs. Physical File System Backup," Usenix Association, Proceedings of the 3rd Symposium on Operating Systems Design and Implementation, New Orleans, Louisiana, Feb. 1999 (12 pages).
IBM, "IBM RAMAC Virtual Array," IBM, Redbooks, Jul. 1997, (490 pages).
IBM, "Setting Up and Implementing ADSTAR Distributed Storage Manager/400," IBM, Redbooks, Mar. 1995 (350 pages).
Informix Corporation, "Informix Backup and Restore Guide," Dec. 1999 (280 pages).
Informix Corporation, "Informix Storage Manager: Administrator's Guide," Dec. 1999 (166 pags).
Isilon Systems, "Backup and Recovery with Isilon IQ Clustered Storage," Aug. 2007 (19 pages).
Kara, "Ext4, btrfs and the others," Linux-Kongress, Yhe International Linux System Technology Conference, Oct. 30, 2009 (15 pages).
Keeton et al., "A Framework for Evaluating Storage System Dependability," Proceedings of the 2004 International Conference on Dependable Systems and Networks, No Month Listed 2004 (10 pages).
Kim et al., "vol. Management in SAN Environment," IEEE, No Month Listed 2001 (pp. 500- 505).
Klivansky, "A Thorough Introduction to FlexClone™ Volumes," Network Appliance, Inc., Oct. 2004 (35 pages).
Klosterman, "Delayed Instantiation Bulk Operations for Management of Distributed, Object-Based Storage Systems," Department of Electrical and Computer Engineering, Carnegie Mellon University, Pittsburgh, Pennsylvania, Aug. 2009 (255 pages).

(56) References Cited

OTHER PUBLICATIONS

Kulkarni et al., "Redundancy Elimination Within Large Collections of Files," Usenix Association, Proceedings of the General Track: 2004 Usenix Annual Technical Conference, Boston, MA, Jun. 27-Jul. 2, 2004 (15 pages).
Lee et al., "A Comparison of Two Distributed Disk Systems," Systems Research Center, Palo Alto, California, Apr. 30, 1998 (25 pages).
Lee et al., "Petal: Distributed Virtual Disks," ACM, No Month Listed 1996 (pp. 84-92).
Legato, "Legato NetWorker Release 6.1 UNIX Version: Administrator's Guide," No Month Listed 2001 (638 pages).
Leins et al., "Tivoli Storage Manager Version 3.7.3 & 4.1: Technical Guide," IBM, Redbooks, Sep. 2000 (368 pages).
Linett et al., "The Real Problems of Backup," Fourth NASA Goddard Conference on Mass Storage Systems and Technologies, College Park, Maryland, Mar. 28-30, 1995 (13 pages).
Mesnier et al., "Object-Based Storage," IEEE Communications Magazine, Aug. 2003 (pp. 84-90).
Mesnier et al., "Object-Based Storage," IEEE Potentials, Apr./May 2005 (pp. 31-34).
Milligan et al., "Simplifying Management of Complex Business Operations (A Study of Mainline Storage Virtualization)," CMG 2001 Proceedings, vol. 2, Dec. 2-7, 2001 (13 pages).
Mortimer et al., "ADSM Version 3 Technical Guide," IBM, Redbooks, Dec. 1998 (384 pages).
Mortimer et al., "Using ADSM to Back Up Databases," IBM, Redbooks, Jul. 1998 (618 pages).
Mullender et al., "Immediate Files," Software—Practice and Experience, vol. 14, No. 4, Apr. 1984 (po. 365-368).
Muller et al., "A High Performance Multi-Structured File System Design," ACM, No Month Listed 1991 (pp. 56-67).
Mushran, "OCFS2: A Cluster File System for Linux: User's Guide for Release 1.4," Jul. 2008 (44 pages).
Muthitacharoen et al., "A Low-Bandwidth Network File System," ACM, No Month Listed 2001 (pp. 174-187).
NetApp, Inc., "Data ONTAP® 7.3 Data Protection: Online Backup and Recovery Guide," Jun. 2008 (405 pages).
NetApp, Inc., "Data ONTAP® 7.3 System Administration Guide," Nov. 2010 (349 pages).
Network Appliance Inc., "Data ONTAP 10.0: Architecture Basic Concepts Guide," Nov. 2006 (18 pages).
Network Appliance Inc., "SnapManager® 2.1 for Oracle® Installation and Administration Guide," Apr. 2007 (272 pages).
Network Appliance, Inc., "Data ONTAP™ 6.3 Command Reference," Network Appliance, Inc., Sunnyvale, California, Aug. 2002 (452 pages).
Network Appliance, Inc., "Network Appliance™ SnapMirror® Software," No Month Listed 2006 (2 pages).
Osuna et al., "Data Protection Strategies in IBM System Storage N Series," IBM, Redbooks, Jun. 2008 (90 pages).
Osuna et al., "IBM System Storage N Series SnapMirror," IBM, Redbooks, Jul. 2006 (124 pages).
Pate et al., "Implementing SnapShot," IBM, Redbooks, Jul. 1999 (214 pages).
Pate et al., "RA,AC Virtual Array, Peer-to-Peer Remote Copy, and IXFP/SnapShot for VSE/ESA," IBM, Redbooks, Jan. 1999 (84 pages).
Pate et al., "RAMAC Virtual Array: Implementing Peer-to-Peer Remote Copy," IBM, Redbooks, Dec. 1998 (140 pages).
Patterson et al., "SnapMirror®: File System Based Asynchronous Mirroring for Disaster Recovery," Usenix Association, Proceedings of the FAST 2002 Conference on File and Storage Technologies, Monterey, California, Jan. 28-30, 2002 (14 pages).
Petition for Inter Partes Review of U.S. Pat. No. 8,299,944 Under 35 U.S.C. §§ 311-319 and 37 C.F.R. §§ 42.1-.80, 42.100-.123, Aug. 6, 2015 (43 pages).
Petition for Inter Partes Review of U.S. Pat. No. 8,788,769 Under 35 U.S.C. §§ 311-319 and 37 C.F.R. §§ 42.1-.80, 42.100-.123, Aug. 7, 2015 (71 pages).
Phillips, "Zumastor Linux Storage Server," Proceedings of the Linux Symposium, vol. 2, Ottawa, Ontario, Canada, Jun. 27-30, 2007 (14 pages).
Prahlad et al., "Method for Managing SnapShots Generated by an Operating System or Other Application," U.S. Appl. No. 60/326,021, Sep. 28, 2001 (16 pages).
Quinlan et al., "Venti: A New Approach to Archival Storage," Usenix Association, Proceedings of the FAST 2002 Conference on File and Storage Technologies, Monterey, California, Jan. 28-30, 2002 (14 pages).
Sadagopan et al., "NetApp Technical Report: Oracle Fusion Middleware DR Solution Using NetApp Storage," NetApp., May 2008 (38 pages).
Sarkar, "Instant Image: Transitive and Cyclical Snapshots in Distributed Storage Volumes," Euro-Par 2000, No Month Listed 2000 (pp. 1284-1291).
Schuettinger et al., "Helping DBAs Become More Efficient: NetApp Efficiency and Manageability Advantages," NetApp, Inc., Jul. 2009 (12 pages).
Solid et al., "Network Appliance Adds SnapRestore, SnapMirror to OnTap," Computergram International, Apr. 26, 1999 (2 pages).
Solter et al., "OpenSolaris™ Bible," Wiley Publishing, Inc. Indianapolis, Indiana, No Month Listed 2009 (9 pages).
Sweeney, "xFS In-core Inode Management," retrieved online at [URL:<<http://linux-xfs.sgi.com/projects/xfs/design_docs/>>] Nov. 29, 1993 (10 pages).
Symantec Corporation, "Symantec Backup Exec Quick Recovery & Off-Host Backup Solutions for Microsoft Exchange Server 2003 & Microsoft SQL Server," No Month Listed 2005 (9 pages).
Syncsort Incorporated, "Near-Instant Oracle Cloning with Syncsort AdvancedClient Technologies," No Month Listed 2007 (12 pages).
Syncsort Incorporated, "Syncsort Backup Express Advanced Recovery for NetApp," No Month Listed 2008 (12 pages).
Tate et al., "Implementing the IBM System Storage SAN vol. Controller V4.3," IBM, Redbooks, Oct. 2008 (970 pages).
Thekkath et al., "Frangipani: A Scalable Distributed File System," Proceeding SOSP '97, Proceedings of the Sixteenth ACM Symposium on Operating Systems Principles, No Month Listed 1997 (25 pages).
Tretau et al., "IBM TotalStorage Nas Backup and Recovery Solutions," IBM, Redbooks, Jul. 2002 (226 pages).
Veritas Software Corporation, "Veritas File System 4.1 Administrator's Guide," May 2005 (270 pages).
Veritas Software Corporation, "Veritas FlashSnap Point-in-Time Copy Solutions, Administrator's Guide 4.1," Apr. 2006 (102 pages).
Veritas Software Corporation, "Veritas NetBackup 4.5 Business Server™: Getting Started Guide," Mar. 2002 (91 pages).
Veritas Software Corporation, "Veritas NetBackup™ 4.5 for Informix: System Administrator's Guide," Mar. 2002 (94 pages).
Veritas Software Corporation, "Veritas NetBackup™ 4.5: User's Guide for UNIX," Mar. 2002 (212 pages).
Vmware, "Vmware Consolidated Backup: Best Practices and Deployment Considerations for SAN Environments," retrieved online at [URL:<<https://web.archive.org/web/20080804070141/http://www.vmware.com/files/pdf/vcb_best_practices>>] No Month Listed 2007 (39 pages).
Wolf, "VM Backup Bliss? The State of VM Data Protection in the Enterprise," Burton Group, Midvale, Utah, Aug. 1, 2007 (45 pages).

\* cited by examiner

| Transformation attributes 352 |
|---|
| Pre-processing 323 |
| Subsetting 324 |
| Masking 325 |
| Data Quality 326 |
| Post-processing 327 |

FIG. 3C

| Source Data attributes 351 |
|---|
| Description 319 |
| Source Address 320 |
| Source Access Method 321 |
| Source Access Protocol 322 |

FIG. 3B

| Access Control attributes 354 |
|---|
| Access Control 335 |
| Read/Write 336 |
| Expiration 337 |
| Number Users 338 |
| Checkin Allowed 341 |

FIG. 3E

| User Access attributes 353 |
|---|
| Required Server Address 328 |
| Server Address 329 |
| Mount Naming 330 |
| Access Protocol 331 |
| Access Method 332 |
| Copy Data Address 333 |
| Copy Data Creation Time 334 |

FIG. 3D

| Commands |
|---|
| edit [-p password] [-n name] [-f] [-t filename] attribute-class attribute-name attribute-value 750 |
| status [-p password] [-t filename] 751 |
| branch [-p password] [-t filename] 752 |
| checkout [-p password] [server mount-naming] [-t filename] -u 753 |
| checkin [-p password] [-t filename] 754 |
| delete [-p password] [-f] [-t filename] 755 |
| create [-p password] [s-t filename] 756 |

FIG. 7

INTEGRATING COPY DATA TOKENS WITH SOURCE CODE REPOSITORIES

CROSS REFERENCE TO RELATED APPLICATIONS

This application is related to U.S. patent application Ser. No. 14/789,345, entitled "DATA VIRTUALIZATION USING COPY DATA TOKENS," filed on Jul. 1, 2015, which issued on Apr. 7, 2020, as U.S. Pat. No. 10,613,938, the entire content of which is herein incorporated by reference.

FIELD

The subject matter disclosed in this application generally relates to data virtualization using copy data tokens.

BACKGROUND

There are often many departments, groups and applications in any company that would like to get access to the data being created in the Production environment. These include Development, Test, Analytics, Compliance, Marketing, among others. Production does not allow external groups to directly access the Production data fearing that they will effect performance and/or integrity of the data. Because of this, the only way to get access is to get a copy.

There are three main methods to getting a copy of the Production data and they have their downsides. The single largest obstacle to getting a copy is finding a time that it can be created. The action of copying the data will create a performance drop and would need to be scheduled and managed as to when it could occur. Assuming the right schedule could be found, a simple copy of the data could be created. If this is continually changing data, then the simple copy method cannot be used. The second approach would be to create a snapshot on the storage array. This is attractive because it is created quickly and can easily be destroyed when no longer needed. The downside to this is that access to the snapshot will share the same storage array resources with the Production data. Although this solves the problem of data integrity because it is a separate copy, it does not solve the problem of performance impact. The final method used is to get the copy from a backup. Companies will protect the production data by doing a daily backup of it. This creates an independent copy of the data. Restoring the data provides a completely independent copy that does not affect the integrity or the performance of the Production data. The downside with this approach is the amount of time it takes to restore the backup. It could take hours to days to weeks to get a copy of a complex and large data set.

A new solution in the market is Copy Data Virtualization. This captures one full copy and then captures incremental change data according to a schedule. Using storage virtualization techniques, it can provide independent copies in seconds to minutes, regardless of complexity and size. This approach meets the requirements or not effecting integrity or performance and also solves the problem of the time it takes to restore from a backup.

Once a copy of the data is available, it may need further processing to protect sensitive data contained within. For example, a database might contain credit card numbers. The data is protected while in the Production environment but if a copy of the database was provided to Development and Test environment, it will have lost many of the protections that exist in the Production environment. According to the requirements of who will be using it, what the need is and what environment it will exist in, a number of transformations to the data might need to take place. This could include subsetting, masking and data quality checks.

Now that there is a copy and it has been transformed, it now needs to be made accessible to the users outside of the Production environment. This process needs to be repeatable, scalable and manageable. The concept of a copy data token is used to create a self-describing entity that can be kept in a library of data sources and accessed in a controlled manner from within and outside of the Production environment.

SUMMARY

Copy data tokens are the center of a self-describing infrastructure that enables data reuse and sharing in a controlled, managed environment. The user of the copy data token gains the benefits of access to data without having to either be knowledgeable about storage management or need to wait for an expert to help. The providers of the data do not have to provide such a high level of management because the system can be managed in a self-service manner. The providers of the data are able to retain the performance, security and integrity of their data while sharing it with a larger audience.

The disclosed subject matter includes a computerized method for integrating a data token into a version control system. The data token defines attributes for copy data associated with the data token to facilitate the automatic management of the copy data for the version control system. The computerized method includes executing, by a computing device with a processor and memory, a first command associated with the version control system configured to store in the memory (a) a copy of source code associated with the source code repository from a remote repository, and (b) a copy of the data token from the remote repository, the data token defining attributes associated with copy data for use with the source code repository, the attributes comprising source data for the copy data indicative of a data source for the copy data, and mount data indicative of a device to which the computing device mounts the copy data. The computerized method includes executing, by the computing device, a second command associated with the version control system configured to create a version of the source code stored in the memory. The computerized method includes creating, by the computing device, based on the execution of the second command a working copy of the copy data based on the data token for use with the version of the source code, including creating a copy of the copy data from the data source based on the source data, and mounting the working copy to the device based on the mount data, thereby automatically managing the copy data for the version control system.

The disclosed subject matter includes a computerized apparatus for integrating a data token into a version control system. The data token defines attributes for copy data associated with the data token to facilitate the automatic management of the copy data for the version control system. The apparatus comprising a processor configured to run a module stored in memory that is configured to cause the processor to execute a first command associated with the version control system configured to store in the memory (a) a copy of source code associated with the source code repository from a remote repository, and (b) a copy of the data token from the remote repository, the data token defining attributes associated with copy data for use with the source code repository, the attributes comprising source data for the copy data indicative of a data source for the copy data, and mount data indicative of a device to which the computing device mounts the copy data. The module stored in memory is configured to cause the processor to execute a second command associated with the version control system configured to create a version of the source code stored in the memory. The module stored in memory is configured to cause the processor to create based on the execution of the second command a working copy of the copy data based on the data token for use with the version of the source code, comprising creating a copy of the copy data from the data source based on the source data, and mounting the working copy to the device based on the mount data, thereby automatically managing the copy data for the version control system.

The disclosed subject matter includes a non-transitory computer readable medium having executable instructions operable to cause an apparatus to execute a first command associated with the version control system configured to store in the memory (a) a copy of source code associated with the source code repository from a remote repository, and (b) a copy of the data token from the remote repository, the data token defining attributes associated with copy data for use with the source code repository, the attributes comprising source data for the copy data indicative of a data source for the copy data, and mount data indicative of a device to which the computing device mounts the copy data. The executable instructions are operable to cause an apparatus to execute a second command associated with the version control system configured to create a version of the source code stored in the memory. The executable instructions are operable to cause an apparatus to create based on the execution of the second command a working copy of the copy data based on the data token for use with the version of the source code, comprising creating a copy of the copy data from the data source based on the source data, and mounting the working copy to the device based on the mount data, thereby automatically managing the copy data for the version control system.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

These and other capabilities of embodiments of the disclosed subject matter will be more fully understood after a review of the following figures, detailed description, and claims. It is to be understood that both the foregoing general description and the following detailed description are explanatory only and are not restrictive of the claimed subject matter.

BRIEF DESCRIPTION OF THE DRAWINGS

Various objects, features, and advantages of the disclosed subject matter can be more fully appreciated with reference to the following detailed description of the disclosed subject matter when considered in connection with the following drawings.

FIGS. 3A-3E illustrate an exemplary copy data token structure, including, attribute classes, and attribute names, according to some embodiments;

FIG. 7 illustrates an exemplary set of operations for a copy data token that can be supported by a command line interface, according to some embodiments;

DESCRIPTION

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

In some exemplary embodiments, a data structure (e.g., referred to as a copy data token) is provided to automatically manage access to copy data associated with the data token. The data token defines attributes for the copy data associated with the data token to facilitate the automatic management of the associated copy data. Each data token can be customized for an associated user or application. Therefore the copy data token can keep track of copy data so that copy data can be automatically managed for each user that needs to access the copy data while still providing customization for the particular user.

In some embodiments, the copy data token includes information that describes what it is, its configuration, its contents, and/or the like. It can be passed to a system to gain access to a data set. By adding to this concept a set of storage functions like snapshot and storage virtualization, a system can be provided that gives users access to a library or collection of Copy Data Tokens which in turn provide access to the data. Using storage virtualization, a single real copy of data can be used to provide multiple copies to multiple users with the same token.

In some embodiments, the copy data token includes sufficient data to provide information necessary to know where the data associated with the token came from, how it was prepared, how to get the data, whether a user could access the data, and/or the like. This template could be used, for example, for both gaining access to data along with running automation to create the copy to be used for reuse.

Figure 1:
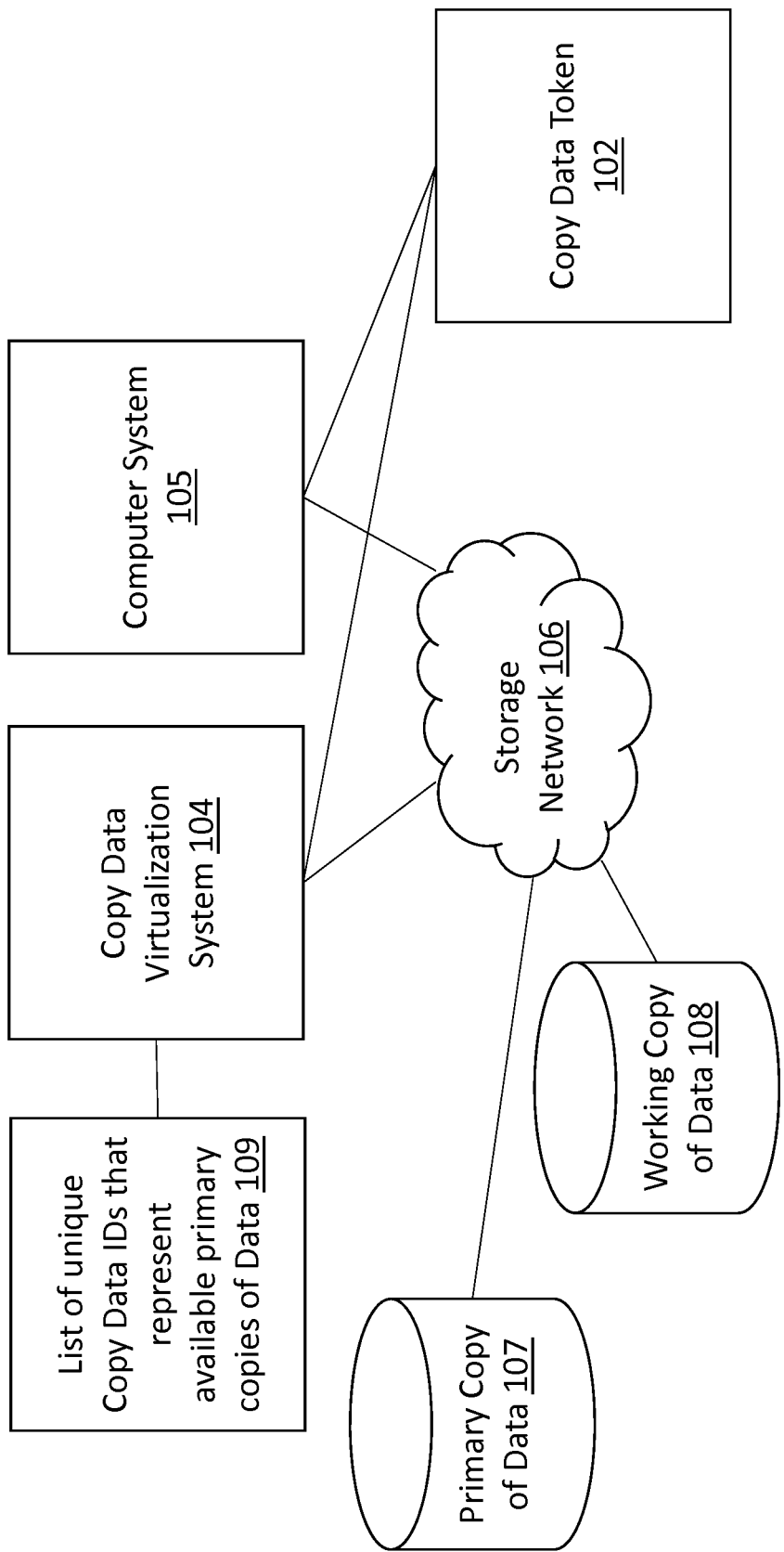
FIG. 1 illustrates an exemplary creation process for a copy data token, according to some embodiments.
Figure 20:
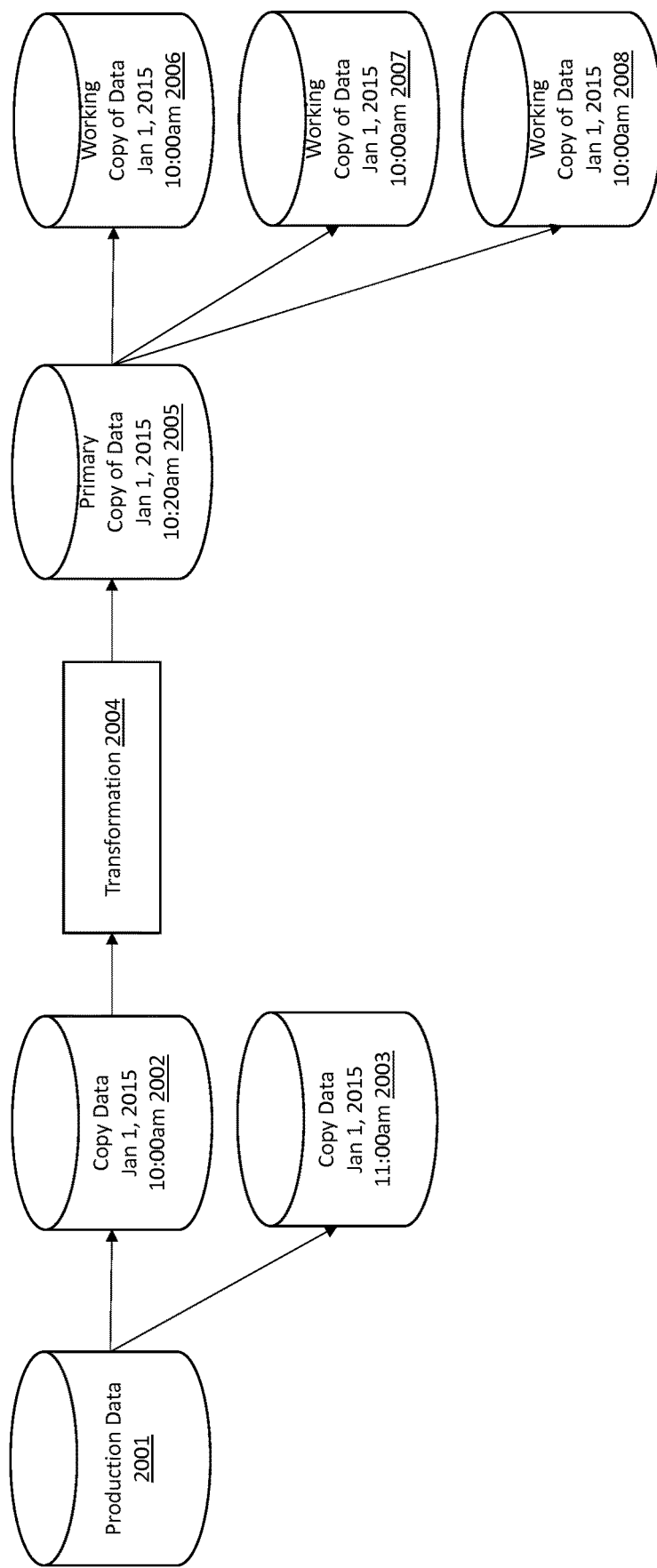
FIG. 20 is an exemplary diagram illustrating copy data token data relationships for copy data tokens, according to some embodiments.

FIG. 20 illustrates an exemplary diagram of relations of data used in a copy data token system, according to some embodiments. The diagram in FIG. 20 shows production data 2001, copy data 2002 that was created on Jan. 1, 2015 at 10:00 am, copy data 2003 that was created on Jan. 1, 2015 at 11:00 am, a transformation process 2004 (which is described in further detail herein), a primary copy of data 2005 carrying forward the creation time of the copy data 2002, a working copy of data 2006 carrying forward the creation time of the copy data 2002, a working copy of data 2007 carrying forward the creation time of the copy data 2002, and a working copy of data 2008 carrying forward the creation time of the copy data 2002. Production data 2001 is any information that is created and stored within the production environment of a data center. It is typically related to ongoing operations of the company or organization. Copy data 2002 and 2003 are copies of the production data 2001 that have been copied at a given time. Transformation 2004 is a set of operations such as data masking which are used to transform the input data to a new copy on the output side. Primary copy of data 2005 is the new copy of data as a result of executing the transformation 2004 operation. Working copy of data 2006, 2007 and 2008 are copies being created by the copy data virtualization system as shown in FIG. 1 as copy data virtualization system 104.

A specific version of production data can be captured from Production data 2001 using a copy data virtualization system and is captured as copy data at Jan. 1, 2015 at 10:00 am 2002 and at Jan. 1, 2015 11:00 am 2003. The copy data 2002 and 2003 are in the same native format as the production data 2001 and are copies existing outside of the production environment. These copies can then be reused as needed. Copy data 2002 is put through a transformation 2004 process that may include operations such as data masking with the result being primary copy of data 2005. The goal of the transformation process is, for example, to remove data, such as credit card numbers, that cannot exist outside of the production environment. The primary copy of data created at Jan. 1, 2015 10:20 am 2005 is an copy of the copy data 2002 with the difference being that credit card numbers have been changed from real numbers to fake numbers. As different users are using the copy data token the system it is automatically creating, for each user, a single working copy of data 2006, 2007 and 2008. These copies are created so the primary copy of data 2005 is not modified and can continue to be reused by many people. A user could delete a work copy, for example 2006, and then recreate it from the primary copy 2005. This allows users to try operations that would modify the working copy 2006 and then decide to get rid of the changes by starting over with a fresh copy from primary copy of data 2005.

In some embodiments, the techniques use a command line tool or API that provides a set of operations based on the contents of a token. The command line can be added, for example, to plug-ins, triggers or hooks (e.g., names for methods of integration into applications) for integration into applications. This is described in further detail herein.

Figure 4:
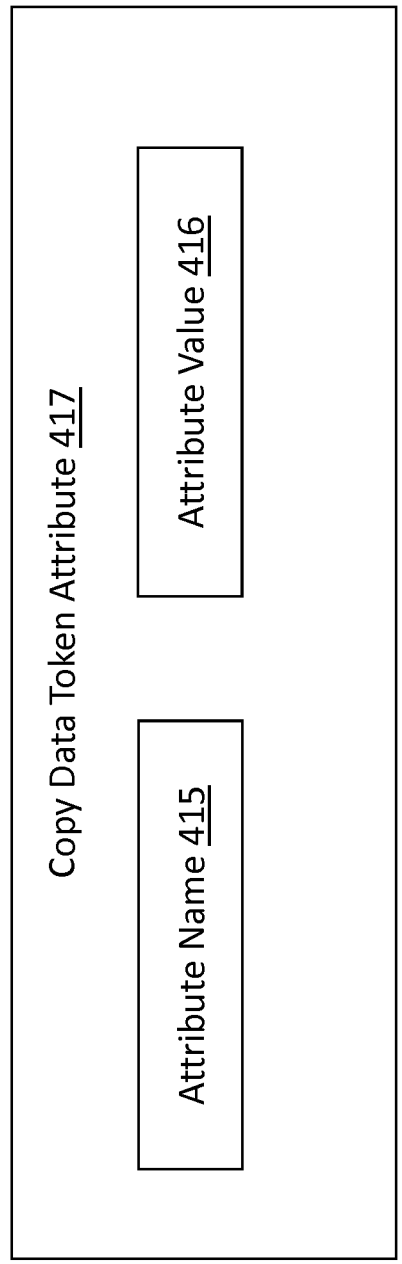
FIG. 4 illustrates exemplary attributes for a copy data token, according to some embodiments.

FIG. 7 illustrates an exemplary set of operations for a copy data token that can be supported by a command line interface, according to some embodiments. The commands shown in FIG. 7 include an edit command 750, a status command 751, a branch command 752, a checkout command 753, a checkin command 754, a delete command 755, and a create command 756. An edit command 750 is used to modify or create token attributes, e.g., as shown in FIG. 4, copy data token attributes 417. A status command 751 is used to provide a status of the data in the copy data token system or software, e.g., as show in FIG. 5 as application or command line tool 501. The branch command 752 will cause the copy data virtualization system to make a new working copy of data (e.g., FIG. 20, working copy of data 2006, 2007, 2008) from the Primary copy of data (e.g., FIG. 20, primary copy of data 2005). The checkout command 753 will make the working copy of data 2006 accessible or not accessible. The checking command 754 will make a working copy of data 2006 to be promoted to a primary copy of data 2005 so it can be preserved and shared. A delete command 755 is used to remove a working copy of data 2006. A create command 756 is used to create a new primary copy of data 2005.

Edit command 750 can edit a field in the copy data token, which takes as input an attribute-class, attribute-name and an attribute-value. An attribute-class is show, for example in FIG. 3 as attribute classes 314. An attribute-name is shown, for example, in FIG. 3 as attribute name 350 and FIG. 4 as attribute name 415. An attribute-value is shown in FIG. 4 at 416. It is the value stored associated with an attribute name 415 for an attribute 417 as part of a copy data token 310. The -n option is used to specify a name of a data set, as shown in FIG. 3 as data set 312, in the copy data token as shown in FIG. 3 as copy data token 310. This would be used if there is multiple data sets inside a single token, e.g., as shown in FIG. 1 as copy data token 102. If the name does not exist, the command will prompt the user if the name data set should be created. If the -f flag is present, it will create the named data set. The -f flag is used to force it to create a new token, e.g., as shown in FIG. 1 as copy data token 102. Otherwise, it will prompt if the token does not exist.

Status command 751 is used to display the status of the copies of data as shown in FIG. 20 as working copy of data 2006, 2007 and 2008. It will show the current status of each individual copy.

Branch command 752 can cause a new working copy. For example, as shown in FIG. 20 new working copies 2006, 2007 or 2008 can be created from the primary copy of data 2005. This working copy is shown in FIG. 20 as working copy 2006, 2007 or 2008. The token (e.g., the token in FIG. 1 102) will be updated with the address of the new address to the copy data.

Checkout command 753 can cause the working data (e.g., as shown in FIG. 20 2006, 2007, 2008) to be made accessible by causing a mount to occur using the mount information in the data token. The server and mount-naming options as shown in 753 are used to override the attributes in the data token by specifying a different server and mount name than the attributes (e.g., as shown in FIGS. 3 328 and 329). The -u option as show in 753 can cause the data to be dismounted when access is no longer needed.

The checkin command 754 can cause a working copy (e.g., working copy 2006 shown in FIG. 20) to be promoted to a primary copy 2005. The primary copy 2005 can, for example, have further branches (working copies 2006 shown in FIG. 20) taken of it, and checkout 753 can be done by other users, etc.

The delete command 755 will remove the working copy data (e.g., as shown as 2006 in FIG. 20) from the copy data virtualization system as shown as 104 in FIG. 1. The -f flag will force the operation rather than prompting the user to verify the command. If the data is mounted, it will be unmounted.

The create command 756 will create a new primary copy (e.g., primary copy 2005 shown in FIG. 20) data version using the information in the token. This can include any transformation 2004 processing, as discussed further herein. Along with creating a new primary copy, it will create a new copy data token (e.g., copy data token 102 in FIG. 1). If -p option as show in 756 is specified, the copy data token will be encrypted with the specified password.

Each of the commands in FIG. 7, 750, 751, 752, 753, 754, 755, other than create 756, can support an optional of -p to specify a password to access the token. The create command 756 will use the password to encrypt the token. Each command can also support an option of the -t to use to specify a token file name. If it is not specified, an automatic name (e.g., "adk. dt," where .dt represents the file is a data token) can be used. One of skill in the art can appreciate that while the present example is presented as a command line, it can easily be converted to an API or any other method used to communicate commands.

In some examples, the techniques provide a security model for the copy data tokens. The security for the copy data token can protect both the token and the data that a token provides access to.

In some examples, the security model can use one or more of the following security methods. First, the copy data token can be implemented as a file so any external encryption can be used to protect the token outside the scope of the copy data token environment. This can allow users to make choices and integrate with any existing security systems they are using. Second, the copy data token system has a built-in encryption that can be used to add a password to the token file. This is shown in the command line example on FIGS. 7, 750, 751, 752, 753, 754, 755 and 756. This can make the file readable and writeable only by the copy data token software. Third, each token file contains an encrypted checksum of the contents as shown in FIG. 3 as checksum 339. If the file is not encrypted but modified externally from the copy data token system, the checksum will not match the next time the software reads it and an error will be generated.

Fourth, when a token is read and commands are executed based on the contents, the commands are sent to a Copy Data Virtualization system. The Copy Data Virtualization system contains access controls for the data and supports user, role and group based access controls.

Figure 8:
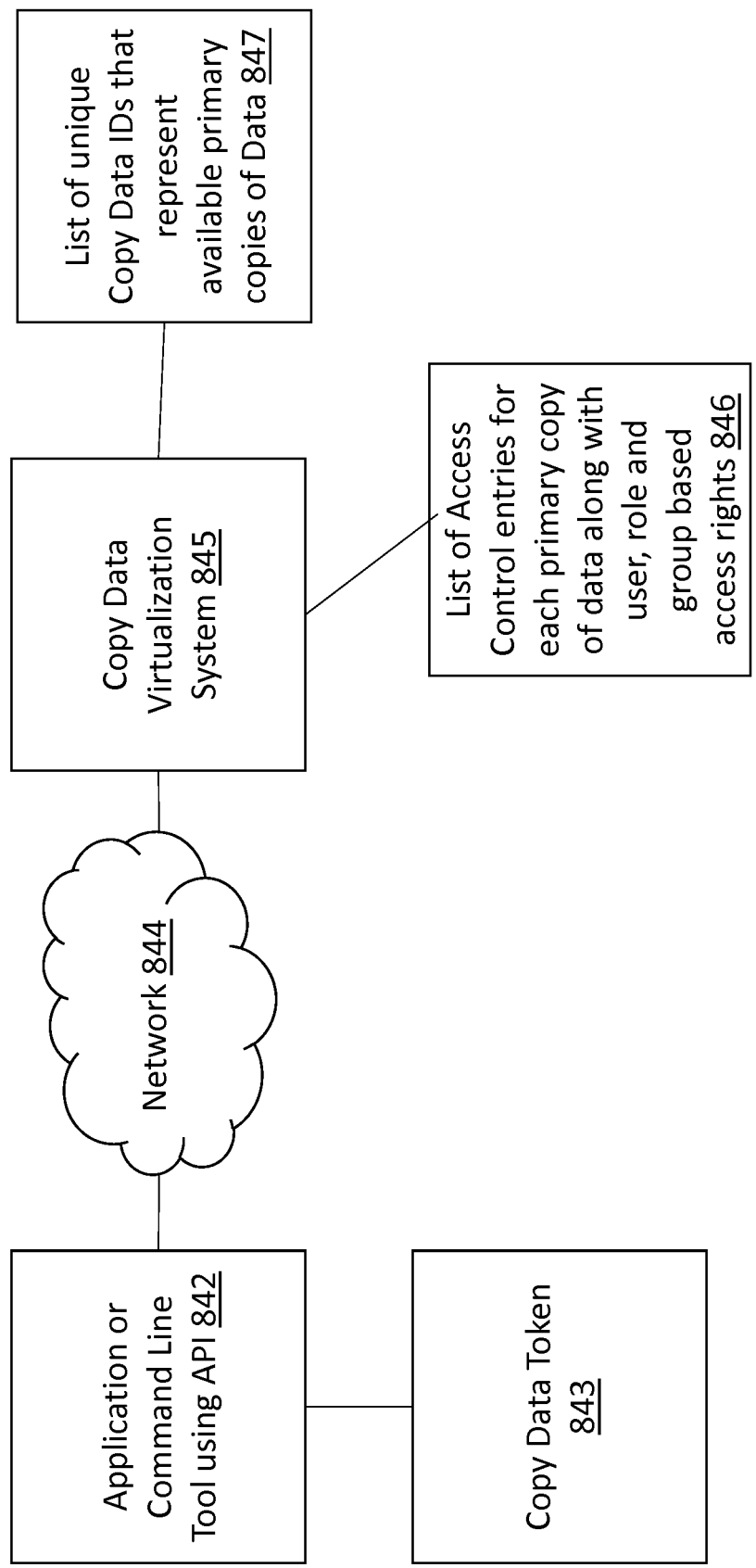
FIG. 8 illustrates an exemplary computerized method for security processing for copy data tokens, according to some embodiments.

FIG. 8 illustrates an exemplary computerized method for security processing for copy data tokens, according to some embodiments. FIG. 8 includes a copy data token 843 and an application or a command line tool configured to use an API 842 that communicates over a network 844 with a copy data virtualization system 845. The copy data virtualization system 845 includes a list of unique copy data IDs 847 and a list of access control entries 846. The application or command tool using API 842 is an example of software that supports command as shown in FIG. 7. Copy data token 843 contains a set of attribute values, e.g., as show in FIG. 3. Network 844 is an interconnect medium to allow software to communicate with other software. Copy data virtualization system 845 can be a copy data virtualization system such as that described in U.S. Pat. No. 8,417,674, entitled "System and Method for Creating Deduplicated Copies of Data by Sending Difference Information Between Near-Neighbor Temporal States," the contents of which are hereby incorporated by reference herein in their entirety. The list of unique copy data IDs that represent available primary copies of data 847 is an internal list of the copy data virtualization system 845 and contains a list of the primary copies of data (e.g., FIG. 20 primary copy of data 2005) that are available. List of access control entries for each primary copy of data along with user, role and group based access rights 846 contains the access control information for people, software and data. The application or command line tool reads the copy data token 843 and issues a command via the API 842. The command can be one of the commands as show in FIG. 7. The command line tool 842 adds the user credentials to the command information and sends the request over Network 844 to the Copy Data Virtualization System 845. The Copy Data Virtualization System 845 has a list of unique Copy Data IDs 847 and also a list of access control entries 846 that provide access control options for the data, user, the role of the user and the groups of the user. The copy data virtualization system 845 will make a decision to allow the command to be executed according to the information in the access controls 846.

Figure 9:
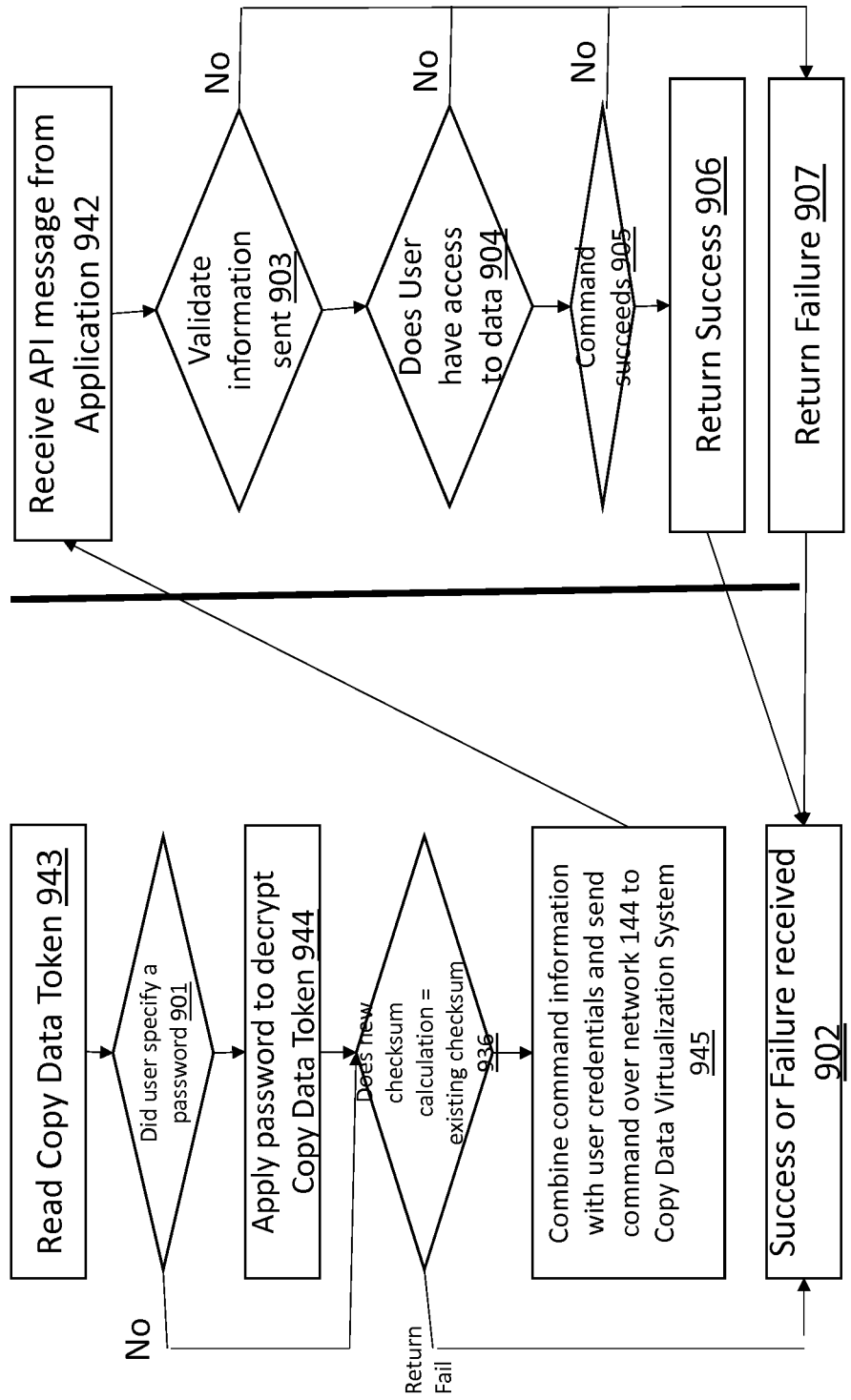
FIG. 9 illustrates an exemplary computerized method for security logic for a copy data token, according to some embodiments.

FIG. 9 illustrates an exemplary computerized method for security logic for a copy data token, according to some embodiments. FIG. 9 shows communication from the application 948 to the copy data virtualization system 949 and includes an operation to read a copy data token 943, a decision to use a password 901, an operation to decrypt the copy data token 944, a decision if the checksum of the token is valid 936, an operation to receive the success or failure 902. On the copy data virtualization side 949, FIG. 9 shows an operation to receive an API message 942, a decision to validate information 903, a decision to check user access 904, a decision if the command execution succeeds 905, a return success 906 and return failure 907.

The process starts with an operation to read the copy data token 943. This could be stored in a file in a JSON, XML or other format. The next step is to check if the user specified a password at decision point 901. If the user did not specify a password, it will skip the next operation. If the user specified a password, execution will continue with decrypting the copy data token 944. The decision is if the checksum (e.g., as show in FIG. 3 as checksum 339) matches the value stored in the copy data token. If it does not match, a failure is return by continuing with operation 902. If it does match, execution will continue by combining the command and the credentials and sending it as shown at step 945 to the copy data virtualization system 949. Execution continues by receiving the message from the application at operation 942. The next step is to decide if the message information is valid. For example, does it contain a valid command as shown in FIG. 7. If the information is not valid, a failure will be returned through operation 907. If the information is validated operation will continue to check if the user has access to the data specified in the message 904. If they do not have access, a failure will be returned through operation 907. If they do have access to the data, the command will be executed and checked for success 905. If the command fails, a failure will be returned through operation 907. If the command succeeds, a success will be return through operation 906. When the return is received by the success or failure operation 902, it will return that information to the caller of the process.

FIG. 1 illustrates an exemplary creation process for a copy data token, according to some embodiments. FIG. 1 includes list of unique copy data IDs 109 that represent available primary copies of data, a copy data virtualization system 104, a computer system 105, a primary copy of data 107, a working copy of data 108, a storage network 106 and a copy data token 102. Copy data token 102 is a copy data token as described in further detail in FIG. 3.

The copy data virtualization system 104 is a system that can be configured to virtualize data. For example, the copy data virtualization system 104 is a copy data virtualization system as described in U.S. Pat. No. 8,417,674, entitled "System and Method for Creating Deduplicated Copies of Data by Sending Difference Information Between Near-Neighbor Temporal States," issued on Apr. 9, 2013, the contents of which are hereby incorporated by reference herein in their entirety. List of unique copy data ids 109 is a list maintained by the copy data virtualization system of the available primary copy of data 107 and working copy of data 108. The computer system 105 creates an environment to allow software to be executed. Primary copy of data 107 is data that has gone through a transformation process as described in FIG. 20, transformation process 104. Working copy of data 108 are copies that are created by the copy data virtualization system 104 from the primary copy of data 107. Storage network 106 enables the copy data virtualization system 104 and computer system 105 to have access to storage containing copies of data. Copy data token 102 encompasses the attributes as shown in FIG. 3. It is read by software running on computer system 105 to help direct the software to specific working data copies 108.

A Computer System 105 will search the Copy Data Virtualization System 104 list of available copies of data 109. After selecting a copy 107, an instruction will be given to the Copy Data Virtualization System 104 to create a working copy 108. The working copy 108 will be created using storage virtualization techniques known to industry so that minimal actual storage would be used. This has a common name of a thin copy in the industry. The copy data token 102 will have the reference to the working copy 108. Software will use the token 102 to make a request to the copy data virtualization system 104 to create a working copy of data 108.

Figure 2:
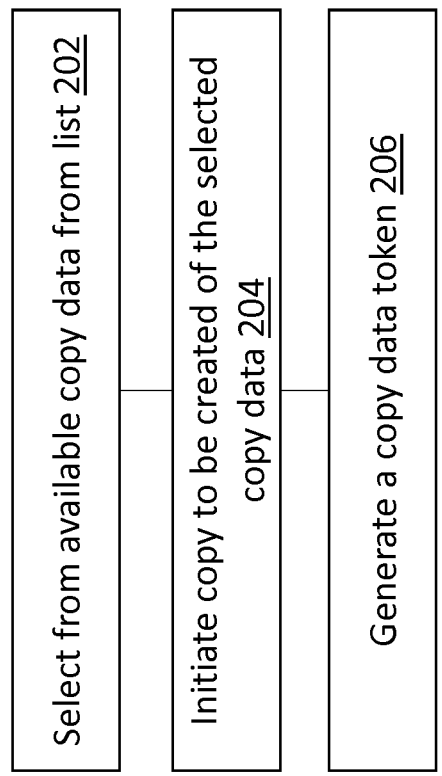
FIG. 2 illustrates an exemplary computerized method to create a copy data token, according to some embodiments.

FIG. 2 illustrates an exemplary computerized creation logic flow to create a copy data token, according to some embodiments. FIG. 2 includes a selection operation 202, a copy operation 204 and a copy data token generation operation 206. The selection operation 202 will scan a list of available primary copy data (e.g., FIG. 1, primary copy of data 107) and return its id. The copy operation 204 will cause the copy data virtualization system (e.g., FIG. 1, copy data virtualization system 104) to create a working copy of data 108 from the primary copy of data 107. The copy data virtualziation system 104 will create a copy data token that describes the working copy of data 108.

At step 202, the copy data virtualization system selects an available copy data from the list of unique copy data IDs. For example, referring to FIG. 1 the copy data virtualization system 504 selects an available copy data from the list of unique copy data IDs 109. At step 204, the copy data virtualization system initiates a copy of the selected copy data. At step 206, the copy data virtualization system generates a copy data token 102, which is described in further detail herein.

Below is an exemplary set of characteristics that a copy data token can contain. It can be implemented, for example, as an XML or JSON file. In the copy data token file, there can be multiple data sets as defined below. Each set of attributes will have a first attribute of "Begin [Name] 311" attribute and a last attribute of "End 313". This allows more complex, dependent sets of data to be described by a single copy data token.

FIG. 4 illustrates exemplary attributes for a copy data token, according to some embodiments. FIG. 4 includes a copy data token attributes 417, attribute name 415 and attribute value 416. The attribute name 415 provides a reference name that can be accessed by software. The attribute value 416 is the value associated with the attribute name 415 and is the value returned to software when referencing attribute name 415. The set is called a copy data token attribute 417.

FIG. 4 shows a copy data token attribute 417, which includes an attribute name 415 and an attribute value 416 for each copy data token attribute. In some embodiments, a copy data token is an organized collection of attributes and their associated values. FIG. 3 illustrates an exemplary organization of a copy data token. FIG. 4 illustrates a single copy data token attribute 417 which is made up of an attribute name 415, for example, FIG. 3, source address 319, and the associated attribute value 416, for example, test. system. company. com/server1/disk12.

Figure 3A:
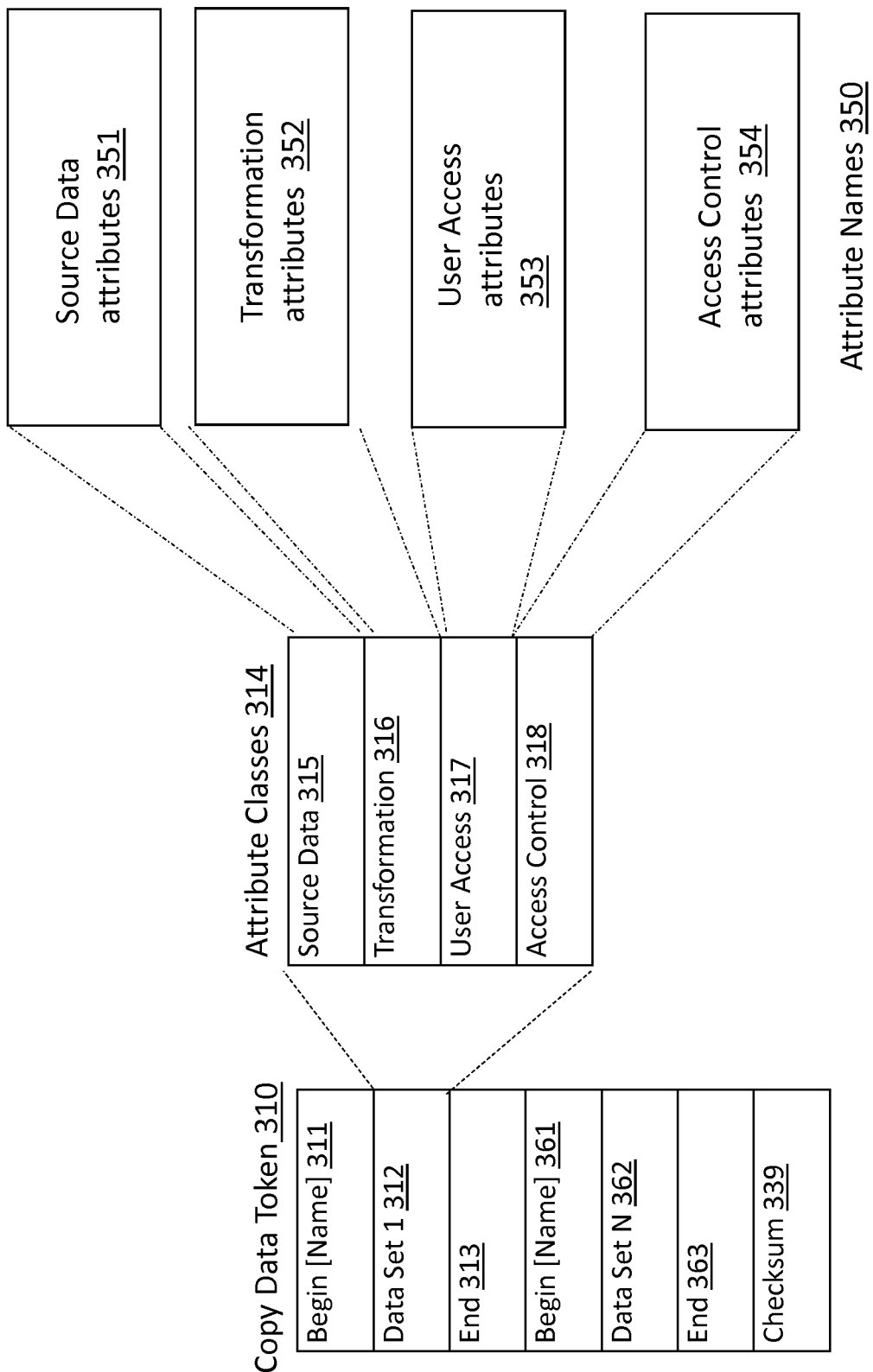

FIGS. 3A-3E, collectively referred to herein as FIG. 3, illustrate an exemplary copy data token, according to some embodiments. FIG. 3 includes copy data token 310, begin section 311, data set 312, data set end 313, begin section 361, data set 362, data set end 363, checksum 339, attribute classes 314, attribute class source data 315, transformation 316, user access 317, access control 318, attributes names 350, source data attributes 351, source 319, source address 320, source access method 321, source access protocol 322, transformation attributes 352, pre-processing 323, subsetting 324, masking 325, data quality 326, post-processing 327, user access attributes 353, required server address 328, server address 329, mount naming 330, access protocol 331, access method 332, copy data address 333, copy data creation time 334, access control attributes 354, access control 335, read/write 336, expiration 337, number users 338 and checkinallowed 341. A copy data token is a set of hierarchically organized copy data token attributes as shown in FIG. 4, copy data token attribute 417. The hierarchy represented in the copy data token 310 starts with a data set 312 (in the example in FIG. 3, it is named "1"). The data set contains a set of attribute classes 314, for example source data 315. Each attribute class has a set of attribute names 350, for example the source data attributes 351 is the set of attributes associated with the source data class 315. The source data attributes contain a set of attributes, for example, source 319, which will contain a value of the description of the source or production data (e.g., FIG. 20, production data 2001).

A copy data token 310 can use many different methods to store the set of attribute names 415 and attribute values 416 it contains. For this description, it will assume to be done with JSON (JavaScript Object Notation) which is well known in the industry. A single copy data token 310 can hold the data for multiple Data Sets 312 and 362. Each Data Set 312 references a Working Copy of data 108. This allows a single copy data token 310 to reference complex and dependent data sets made up from multiple individual Working Copies 108 of data. The Data Set 312 has 4 attribute classes and can be extended as needed. The Source Data 315 attribute class has the information that describes the original source of the data (e.g., FIG. 20, production data 2001). The Transformation 316 attribute class has the description of how the original data was modified to create the Primary Copy 107. User Access 317 attribute class has the requisite information to provide the user with access to the Working Copy 108. Access Control 318 attributes describe who can have access to the Working Copy of the data 108. Checksum 339 is a hashcode of the contents of the token and is encrypted. Any time the token is read by the software, a new hashcode is generated and compared with the checksum 339 in the copy data token 310 to see if the contents have been tampered with.

The Source Data 315 attribute class provides a description of the original source production data along with how to access it. This information is provided so the copy data token 310 can be used to create the Primary Copy 107 from the original data along with being used as a method to reference Working Copy 108 of data. The source attribute name 319 contains a description of the source data. The information contained in Source Address 320 is a unique ID 109 that references one copy of data managed by the Copy Data Virtualization System 104. Source Access Method 321 attributes can contain values such as Block, File System. It is used to inform software on the access method to use to read/write the data. This can be extended for other access methods. The Source Access Protocol 312 attribute describe the low level protocol use to read/write the data. This can contain values such as Fibre Channel, iSCSI, NFS or CIFS and can be extended to support other protocols.

The Transformation 316 attribute class contains information that can be used to describe how the original production data was modified to create the Primary Copy 107. There are three well known operations that are described—Subsetting 324, Masking 325 and Data Quality 326. There are two other attributes used to capture any custom operations required—Pre-processing 323 and Post-processing 327. Subsetting 324 is an operation that will copy a smaller portion of the original data into the Primary Copy 107. Masking 325, also known as Data Masking in the industry modifies personal data so that it is not recognizable. For example, a credit card number is 4 sets of 4 digits. To allow the Working Copy 108 of the data to be used by people regardless of security rights, along with allowing software to work correctly which expects to see 4 sets of 4 digits, the value is modified using industry known approaches so the data stored in the Primary Copy 107 is no longer recognizable from the original. The Data Quality 326 attributes is a broad set of operations that could be checking data for quality to correcting data. For example, it might check a field of data that is supposed to contain USA state abbreviations. There is a known set of values that can be here. This operation can check for them along with converting. An examples of converting would be to change Mass. as an abbreviation to MA. The Pre-processing 323 attribute and Post-processing 327 attribute describe operations that must be done before the well know operations or must be done after them. It can contain other transformations that are custom or set up and break down of special access requirements.

The User Access 317 attribute class contains information for the user of the data to have access. The Required Server Address 328 is an example of an attribute that cannot be modified once set during the initial creation of the token. If this is set to the address of a server, then Server Address 329 will be ignored. This allows the initial creator of the token to force the data to be mounted to a specific server for use. If this is blank, Server Address 329 will be used as the address of the server to mount the data to. The Mount Naming 330 attribute is used if the operating system on the Required Server Address 328 or the Server Address 329 supports the ability to name the mounted data. Access Method 332 attributes can contain values such as Block or File System. It is used to inform software on the access method to use to read/write the data. This can be extended for other access methods. The Access Protocol 331 attribute describe the low level protocol use to read/write the data. This can contain values such as Fibre Channel, iSCSI, NFS or CIFS and can be extended to support other protocols. Copy Data Address 333 is a Working Copy 108 entry from the unique Copy Data ID 109 list. The Copy Data Creation Time 334 has the date and time the Working Copy 108 was created. This information describes where to get the data from and were to mount it to so the user can access the data along with which protocol to access it.

The Access Control 318 attribute class contains information that was set during initial creation of the token and cannot be modified. The Access Control 318 attribute class is used by the software to decide if a user has access to the data referenced by the copy data token 310, User Access 317 attribute class, Copy Data Address 333. It Also provides information about how it will be set up and controlled by the Copy Data Virtualization System 104. Because access control information can be very large and complex, the Access Control 335 attribute contains an ID that is used by the Copy Data Virtualization System 504 to determine the access control that will be enforced. It will enforce access to a specific set of users, roles and groups. This can be expanded to provide other methods or classes of access. The Read/Write 336 attribute will have a value of Read or Read Write. It informs the user if the data they are being given access to can be written to. The Expiration 337 attribute contains the date when the data will expire and be deleted. The Number Users 338 attribute will have the total number of mounts of the data referenced by the token. This would be set if performance is an issue. For example, it could be set to 1 which would mean the access to the data would not be shared. The Checkin Allowed 341 attribute will let the user know if the checkin command is allowed for this data.

Figure 5:
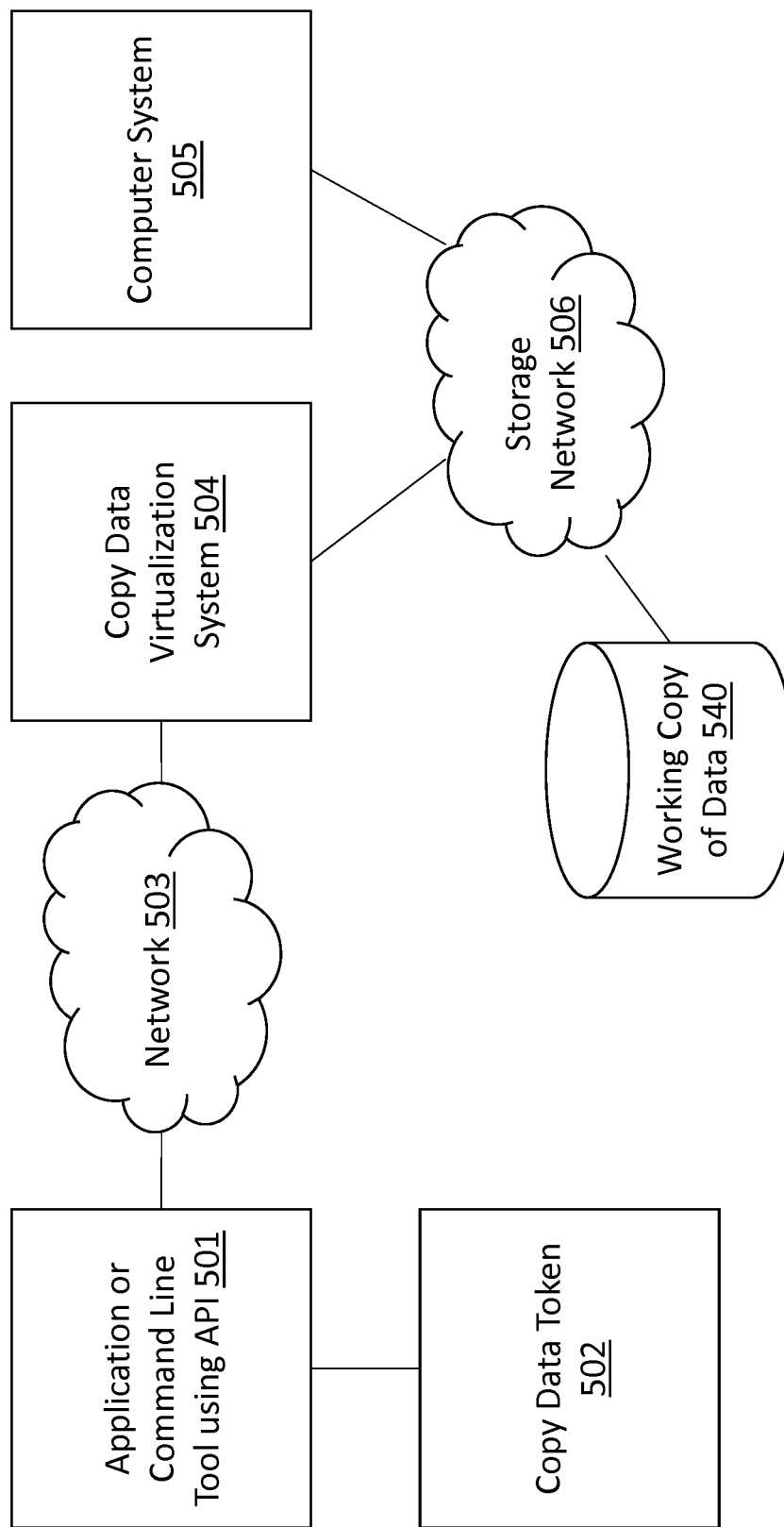
FIG. 5 illustrates an exemplary system for a copy data token, according to some embodiments.

FIG. 5 illustrates an exemplary system for a copy data token system overview, according to some embodiments. FIG. 5 includes an application or command like tool using API 501, network 503, copy data virtualization system 504, computer system 505, copy data token 502, working copy of data 540 and storage network 506. The application or command line tool using API 501 is software that will interpret the copy data token 502 and send commands to the copy data virtualization system 504. The network 503 is used to allow software to communicate with other software. The copy data virtualization system 504 is a copy data virtualization system as described in U.S. Pat. No. 8,417, 674, entitled "System and Method for Creating Deduplicated Copies of Data by Sending Difference Information Between Near-Neighbor Temporal States," issued on Apr. 9, 2013, the contents of which are hereby incorporated by reference herein in their entirety. The computer system allows software to be executed and can connect to data. The storage network 506 allows computers to connect to data. The working copy of data 540 is a copy created from primary copy of data 2005. The copy data token is a set of attributes as shown in FIG. 3, copy data token 310.

In this example, the copy data token is implemented as a file. The copy data token 502 will have been acquired by copying it from a directory of available token files that have been published. This is only one of many methods that could be used to provide access to the available tokens. An application 501 which can either be a copy data token specific command line tool or other software that will use an API to communicate using Network 503 with Copy Data Virtualization System 504. The application 501 will read the information in the copy data token 502 and pass necessary information to the Copy Data Virtualization System 504 to provide access to the data referenced by the token. The API communication would contain The Server Address 329, Mount Naming 330 and Copy Data Address 333, among other information needed to complete the operation. The Copy Data Virtualization System 504 will check the Access Control 318 attributes to decide if access to the data will be granted. If it is approved, The Copy Data Virtualization System 504 will mount the Working Copy 540, using the Storage Network 506 to the Computer System 505. A success will be return to the API and user will have access to the data from Computer System 505.

Figure 6:
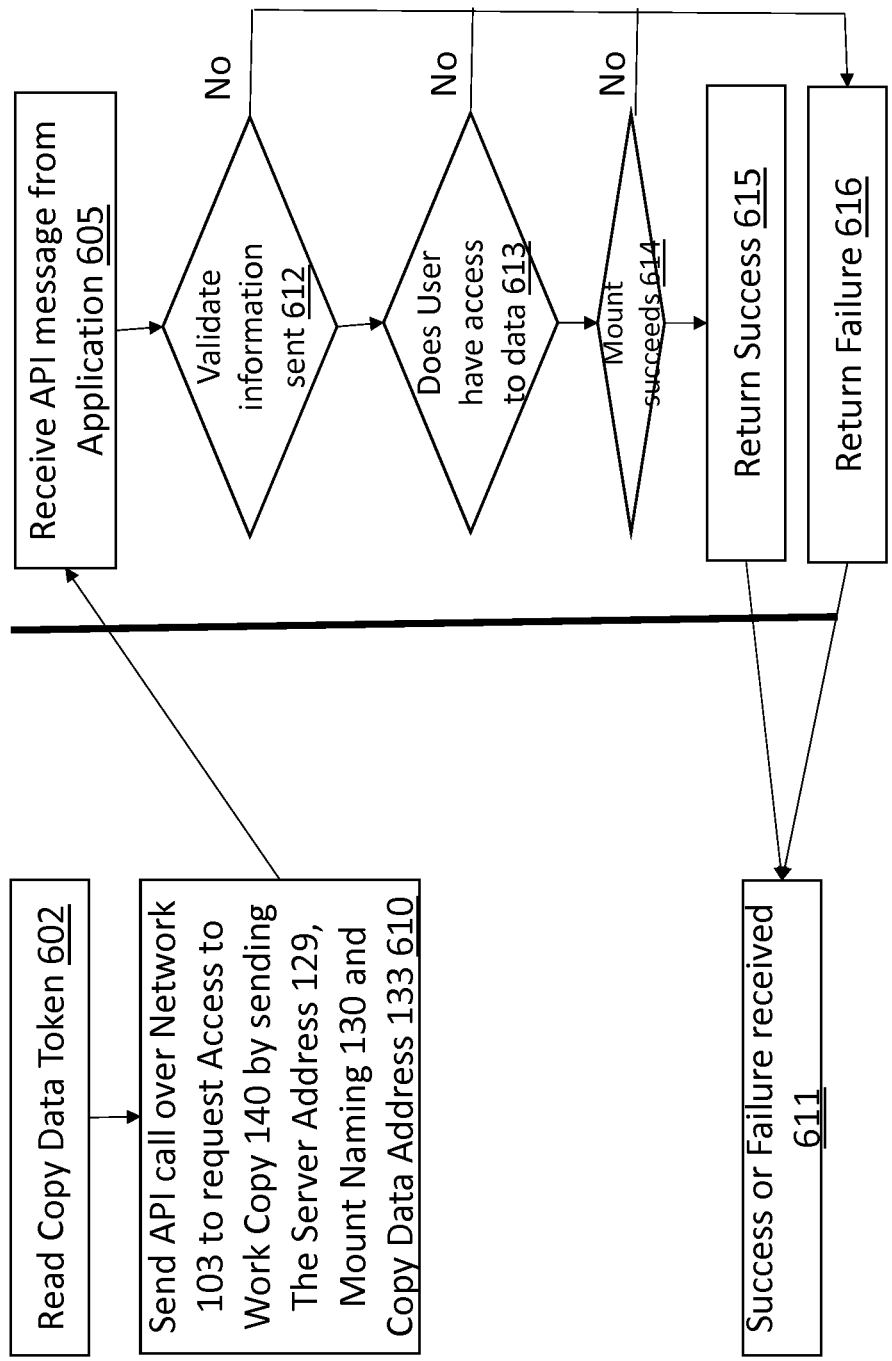
FIG. 6 illustrates an exemplary computerized copy data token exchange, according to some embodiments.

FIG. 6 illustrates an exemplary computerized method for a copy data token system overview logic flow, according to some embodiments. FIG. 6 includes an application 601 side of the process, a copy data virtualization system 604 side of the process, an operation to read a copy data token operation 602, send command over network operation 610, success or failure received operation 611, receive api message from application operation 605, validate information send decision 612, does user have access to the data decision 613, mount succeeds decision 614, return success operation 615, return success operation 616.

The copy data token is a very powerful data service. It provides the basis for data sharing of information across many users, applications and needs without the need for expertise of the user. At the same time, the providers of the data need to retain necessary levels of security and integrity of the data. Note that although this document describes the operations done via a command line tool, they could also be accessed via an API for deeper integration. Below are some use case examples.

In one example, the copy data token can be used for product development and testing. The copy data token can provide the ability to access copies of production data without affecting the production systems. It can also be used in a manner which provides a self-service type of environment. On the application side 601, the process starts by reading the copy data token 602. This provides an application with the information required to be able to access a working copy of data 2006. The application will combine the information from the copy data token and send a command to the copy data virtualization system 604. The receive api message from application 605 operation will pass the information to the validate information send decision 612. This will check to make sure the information is correct, for example, checking to make sure the copy data address 333 has a reference to existing working copy of data 2006. If there is a problem it send failure to the return failure operation 616. If the data is ok, it will flow to a check user has access decision 613. This will check the access control information to make sure the user has access to the specified data. If it fails, a failure will be sent to the return failure operation 615. If it is ok, the mount command decision 614 will execute. If the mount fails, a failure message will be sent to the return failure operation 616. If it succeeds, a success message will be sent to the return success operation 615. The return success operation 615 or the return failure operation 616 will send a message back to the application which is received by operation 611 to see if the operation succeeded or failed. The outcome of the operation will be communicated back to the entity that initiated the operation.

Figure 10:
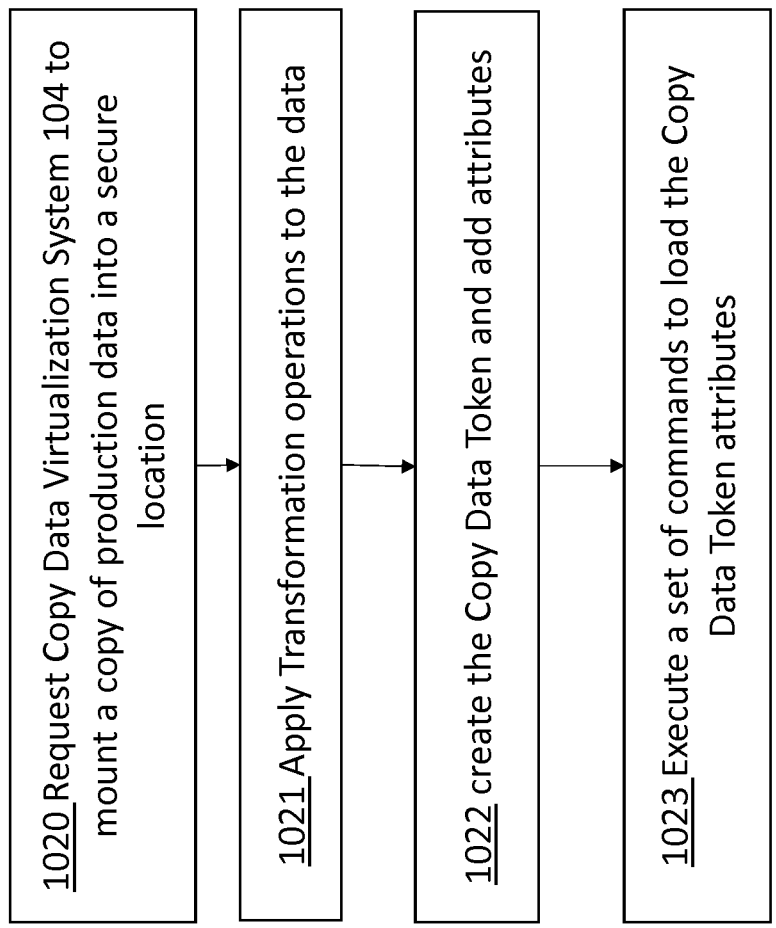
FIG. 10 illustrates an exemplary computerized method for creating a copy data token, according to some embodiments.

FIG. 10 illustrates an exemplary computerized method for creating a copy data token for test and development environments, according to some embodiments. FIG. 10 includes operation 1020 to mount a copy of production data which after transformation will become the primary data, operation 1021 to execute the transformation commands on the primary copy, operation 1022 to use the command line tool and operation 1023 to show example set of command lines executed.

FIG. 10 is an exemplary computerized logic flow of creating a copy data token for test and development environments. The first operation 1020 is to request the copy data virtualization system 104 to mount a copy of the production data 2001. The end goal of the mount is to create a primary copy of data 2005 that can then be used as the basis for working copy of data 2006, 2007 and 2008. Operation 1021 applies a set of transformation operations (e.g., as discussed herein). For example, Data Masking could be used with a goal of hiding real credit card numbers by replacing the numbers with fake ones. As other examples, the transform operations can include Data Subsetting, Data Quality Checking, and/or the like. The result of the transformation operations is data that can be provided into the development and test environments. When completed, the unique ID 109 can be used to use in the token creation.

When the transformation operation 1021 is complete, the result becomes primary copy of data 2005 and the unique ID is saved by the copy data virtualization system 104 into the saved list of unique copy data ids 109. The next step, operation 1022 is to create a copy data token 102 (e.g., using the edit command as shown in FIG. 7) and to add attributes.

Operation 1023 can include a set of copy data token edit commands (e.g., FIG. 7, edit command 750). The edit commands can include, for example:

edit -n primary_data_set -f Source "Dev Test customer list data"

edit -n primary_data_set "Copy Data Address" "Unique_ID" 109 edit -n primary_data_set Masking "Standard Corp Masking Rules"

edit -n primary_data_set "Access Method" Block edit -n primary_data_set "Access Protocol" "Fibre Channel"

edit -n primary_data_set "Read/Write" "Read/Write"

The edit commands can load the information into the attributes 417 in the copy data token 310. It can be seen that not all attributes must be specified and different implementations could have different defaults and different required attributes. At the end of the edit 750 commands in operation 1023 of FIG. 10, a copy data token 310 has been created with a single data set 312 called primary_data_set. It has a description in the source 319 attribute of "Dev Test customer list data". It references copy data address 333 with Unique_ID 109 that was gotten at the end of operation 1021 in FIG. 10. Since there is no server information 328 and 329, the server would need to be specified by the end user or application using the copy data token 310 before causing a checkout 753 command to be executed. The copy data token has information that the primary copy 107 will be mounted using Fibre Channel as a block device in a read/write manner. In some embodiments, the copy data token can be created using a JSON editor (e.g., if the copy data token was implemented as an JSON file).

Figure 11:
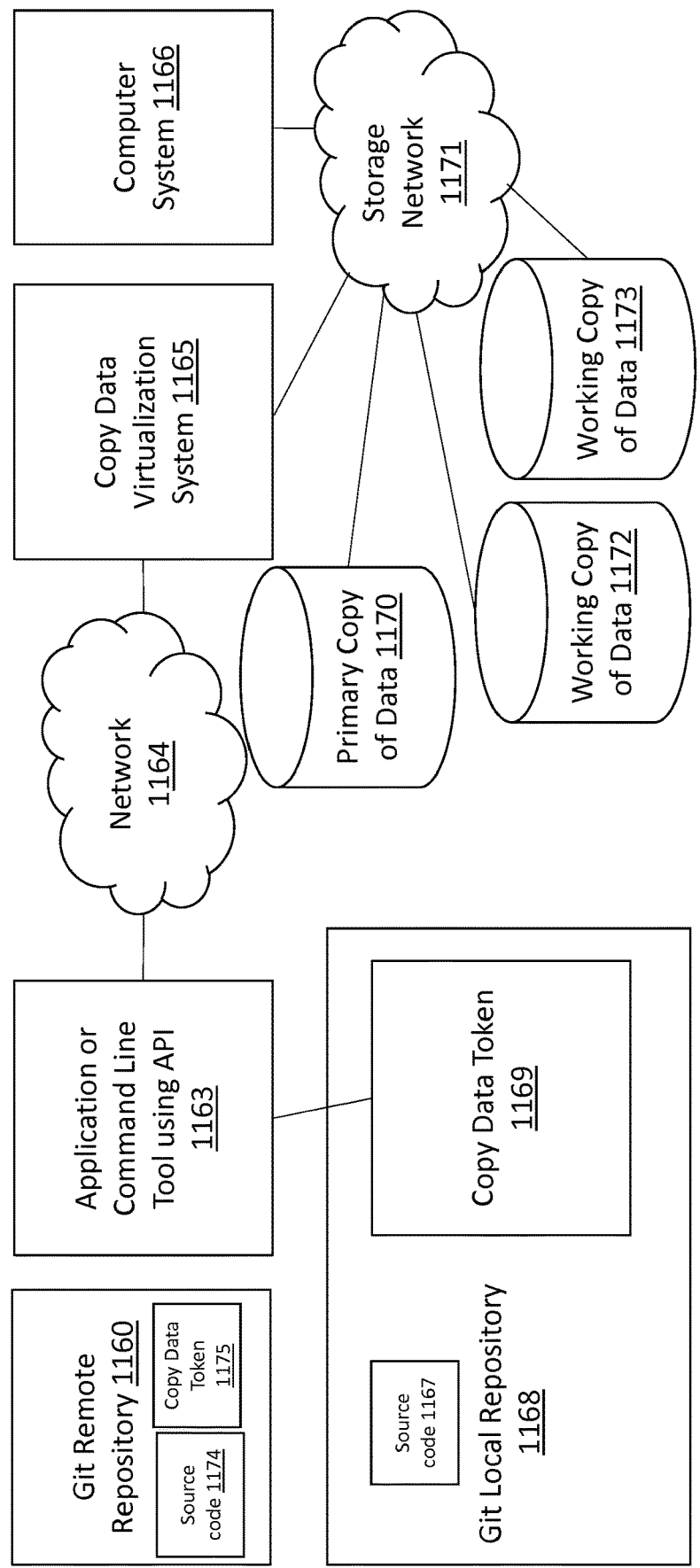
FIG. 11 illustrates an exemplary system diagram for using copy data tokens in development and test environments, according to some embodiments.

FIG. 11 illustrates an exemplary system diagram for using copy data tokens in development and test environments, according to some embodiments. FIG. 11 includes a Git remote repository 1160 which includes source code 1174 and copy data token 1175, an application or command line tool using API 1163, network 1164, copy data virtualiation system 1165, computer system 1166, Git local repository 1168 containing source code 1167 and copy data token 1169, primary copy of data 1170, working copy of data 1172, working copy of data 1173 and storage network 1171. Git remote repository 1160 is part of a Git source code or version control software system that is well known in the development and test industry. Application or command line tool using api 1163 is any software that supports commands shown in FIG. 7 that can read a copy data token 1169 and communicate with a copy data virtualization system 1165. The copy data virtualization system 1165 is a copy data virtualization system as described in U.S. Pat. No. 8,417, 674, entitled "System and Method for Creating Deduplicated Copies of Data by Sending Difference Information Between Near-Neighbor Temporal States," issued on Apr. 9, 2013. Network 1164 provides the ability for the application 1163 to communicate with copy data virtualization system 1165. The computer system 1166 has the capability to run software and connect to data. The Git local repository 1168 is part of the Git source code or version control software system that is well known in the development and test industry. Source code 1167 is managed by Git and stored in the Git repository 1168. Copy data token 1169 is of the type 310 and is stored along with the source code 1167. Primary copy of data 1170 is an example of FIG. 20 primary copy of data 2005. Working copy of data 1172 and 1173 are examples of working copy of data of FIG. 20 working copy of data 2006, 2007 and 2008. The storage network 1171 enables computers and software to connect with data.

Since development and test already have source code control systems in place to track versions of files, copy data tokens can be integrated into that environment to provide ease of use to the developers and testers. For this use case, Git (an open source product available at www.git-scm.com) will be used for exemplary purposes, according to a non-limiting embodiment. Git is a distributed revision control system with an emphasis on speed, data integrity, and support for distributed, non-linear workflows in the development and test environments.

The first step is to create the library of data and tokens that represent the data available (e.g., as discussed in conjunction with FIG. 1). This can be done by someone inside of IT or DBAs that have access to the production data copies in the copy data virtualization system. This can be accomplished using the copy data token create (e.g., FIG. 7, create command 756) command from the command line tool or the copy data can be created via some other means and the information would be manually added to a token using the edit (e.g., FIG. 7, edit command 750). In some embodiments as described herein the creation process can be automated or centrally controlled (e.g., by a copy data virtualization system).

For illustrative purposes only, the integration of the copy data token system into the source code control system will be described via a hook approach which is well known as part of the Git software. This approach can be applied to any number of methods of integration. In the case of the copy data token Administrator—the person creating the copy data—there is no integration to the source code control system. This is done so the initial adding of the copy data tokens to the control system does not create extra copies of data.

The organization of the token files across the source code control system can be dependent on the needs of the organization and users. They could be placed in each code set that makes sense to have access to a specific data copy. They could also be organized so each copy data token is in a separate area. Once the copy data token is in the developers or testers area, they will cause versions of data to be created. For the rest of this exemplary use case, it will be assumed that the copy data tokens are organized along with the product areas they make sense to be used in. Also, the exemplary description is for developers, but testers, etc. can follow a similar use path.

Below is an exemplary set of steps a developer would take and the automated operations that copy data tokens would cause via integration of hooks into the Git as the example system. One of skill can appreciate that one or more of the developer steps, and/or one or more of the steps below can be automated.

The first step a developer would do is a "git pull" from a remote repository. This allows the developer to see what is available. Before doing the checkout, the user may need to set the mount server 329 via a copy data token edit 750 command. The next step is to execute a "git checkout" of source code from the Git system. There is an integration with Git which causes the copy data token branch 752 command to be executed which creates a private copy of the data for the developer. A copy data token checkout 753 command will also be executed to have it mounted and ready for use. Both of these commands occur as automation and are invisible to the user.

If the developer wants to try something they will do another "git branch". This would cause another copy to be created by automation invoking the same commands (752 and 753) that would be accessed within that particular branch. If the developer decides that their idea would not work they delete the branch. Not all commands in Git can have hooks defined for automated integration. If this is true, then the copy data token software will notice the change on its next integrated invocation and will execute the necessary commands. For example, deleting a branch in Git does not have a hook for integration. It is important for the copy data token software to keep track of the branches so it does not leave data existing that is no longer needed. In this case, on the next integrated invocation, for example for a checkout, the copy data software will look at the set of Git branches that exist. If there is data for a branch that no longer exists, it will unmount (if needed) and delete that data. Each new copy will also have an expiration set for them. If there is no later invocation of the copy data software to clean up left over data, they will automatically expire and be deleted.

The user has completed their work and executes a Git commit. This saves the changes on their local system. A hook is executed and the copy they received during checkout is now deleted.

Before the final commit, the developer could contact the copy data token Administrator to promote their working copy of data 2006, 2007 and 2008 to a primary copy of data 2005 for others to reuse. This would be done with the checkin 754 command. The last step is to either push the changes to the remote repository or the changes will get pulled.

For a more detailed description, the Git application has a remote repository 1160 that is stored somewhere away from the user's local computer and storage. It includes source code files 1162 along with the copy data token 1161 created in the FIG. 10 logic flow. When the user executes a Git pull command, a local repository 1168 is created which is a copy of the source code files 1162 in the remote repository. The complete set is copied to the local system and storage. When the Git pull commands is executed, a full copy of the repository, including the source code 1167 and copy data token 1169 would exist in the local repository 1168. The user would now have a private copy of the copy data token 1169. The user would execute a status 751 command to see if a Server Address 329 attributes has been specified. If it is not specified, they would execute a edit 750 command to set the Server Address 329 attribute to the computer system 1166 where they would like the working copy 1172 to be mounted to.

The next step is to execute a Git checkout command. This creates a version of the source code 1167 along with the copy data token 1169 that can be edited. The integration of the copy data token software with the Git software is accomplished with a hook. During the Git checkout command, the hook would execute a branch 752 command which will create a working copy 1172 from the primary copy 1170. The working copy 1172 is a private copy of the primary copy of data 1170. The hook would then execute a checkout 753 command which would mount the working copy 1172 using the storage network 1171 to the computer system 1166 (which is the server named in the copy data token attribute Server Address 329) for the user to read and write during development and testing.

A common Git command is branch. This is used to create a copy of the current copy of the source code, called a branch. The branch could then be used to try a code change without having to undo it in the case that it does not work and the branch is deleted. The Git branch command does not have hook for integration. The user must execute the Git checkout command after creating a new branch or before working on an older branch. There is an integration hook for the Git checkout command. When the Git checkout command is executed, the hook would execute the copy data software which will first check to make sure there are no changes with the branch structure of Git vs the copies that it has created. If a new copy is needed, a branch 752 command which would create working copy 1173 from the primary copy 1170. It would then execute a checkout 753 command to mount it to the computer system 1166 using storage network 1171. If the new copy is not needed because it was created previously, then it will be checked for mount status and will a checkout 753 command would be executed if needed. If the user decided that the change they was working on in the branch was not a good change, they would execute a Git branch delete command. There is no integration hook in Git, so the copy data token software will get invoked again on the next checkout. After analyzing the current Git branch structure, if it finds a branch no longer exists, it would execute delete 755 command. The delete 755 command will unmount the data if it is mounted to computer system 1166, and delete the working copy 1173.

When the user has completed their work, they will execute the Git commit command to tell the Git system that the current version should be saved. The hook will execute a delete 755 command which will unmount and delete the working copy of data 2006. The user has an option to decide to save the working copy of data and can execute a checkin 754 command which would promote the working copy of data 2006 to a primary copy of data 2005.

Another exemplary use case is for application packages. There are many different ways to package one or more applications for distribution. For example, an application can be deployed as Virtual Machine (VM) and that could be packaged into an OVA (Open Virtualization Archive) file. Applications can be deployed is a "Zip" file which is a common name used for a file that contains compressed copies of other files. Applications can be deployed on CDs or DVDs with an executable copying files to the final destination. Applications can be downloaded with a local executable copying files from an external location to the local server. These are examples of the many methods used to deploy an application.

A new approach in the industry is an Application Container (i.e., Docker is an example of these new approaches and well known to the industry) which is a software container that holds the components necessary to deploy a complex application. It could have multiple application images along with their dependencies. One of the goals is to be able to move containers around quickly. If one of the applications requires a large data source such as a database, the size of the container could be very large. Another new approach is a vAPP from VMware which is a container of multiple Virtual Machines (VMs).

Figure 12:
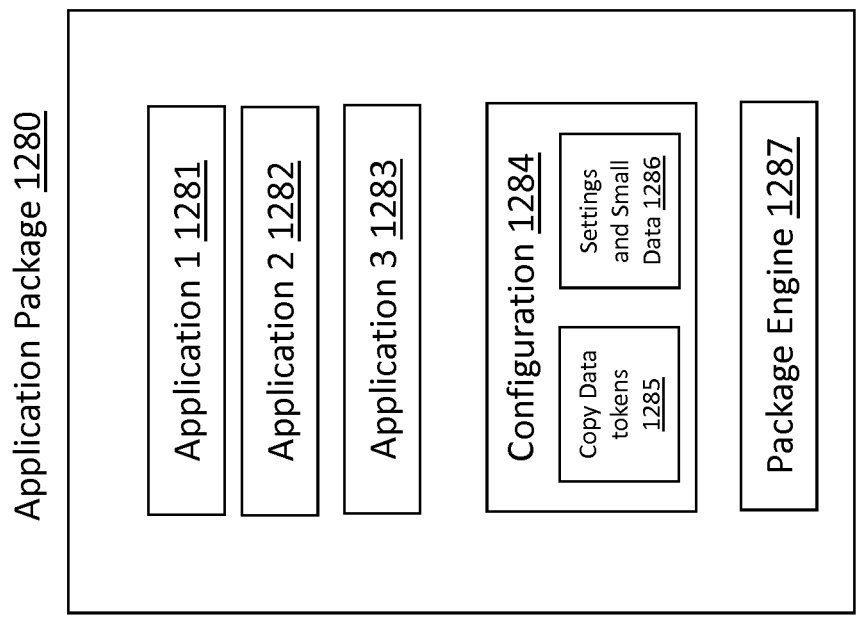
FIG. 12 illustrates an exemplary application packages for copy data tokens, according to some embodiments.

FIG. 12 illustrates an exemplary application packages, according to some embodiments. FIG. 12 includes the application package 1280, application 1 1281, application 2 1282, application 3 1283, configuration 1284 which includes copy data tokens 1285 and settings and small data 1286, and package engine 1287.

The application package 1280 (e.g., as described previously) is a structure that contains one or more applications and other necessary information for deployment. Applications 1281, 1282 and 1283 are examples and can be any software application. Configuration 1284 contains other components necessary for the deployment of the applications. It can contain small amounts of data and configuration and set up information. The Copy data token 310 is added as part of the configuration information. The package engine 1287 may or may not be included with the application package 1280. It is the software that interprets the application package to deploy it in a computer execution environment.

In some embodiments, these installation approaches copy the application and extra files to a location, configure the computer operating system as needed to run the application and are then complete. In some embodiments, some methods may have the same issue if the data required for the application(s) is too large. For example, one could get a software update over the internet measured in MBs but if the data update was measured in 100's of GBs or TBs, people look for better methods. For example, one way is to put the data onto a CD but it limited in capacity. Some embodiments could move to a DVD, then a blu-ray, tape or even a disk array, and/or the like.

In some embodiments, a problem can be to allow data to be deployed at the speed of applications that are part of application containers and enable the application containers to move between systems quickly while still retaining access to the data, regardless of the capacity of the data.

As the application container is deployed, the container engine, or script, is orchestrating the initiation of the applications along with setting up the resources needed. A plug-in to the container engine will enable a copy data token to be used to access data for any data environment as fast as the creation of applications regardless of the size of the data to be access.

In some embodiments, applications that requires access to pre-defined data, from IT or from an external source, can be set up during installation or during initial startup to use copy data tokens for access. One or more copy data tokens could be included with the installation. The token(s) can be modified during installation to customize to the target environment. For example, if the target was Linux VS Windows, the name of the mount point would be different. Either during the installation operation or during the initial application startup, the copy data tokens can be used to cause the correct data to be made available to the correct server.

The basic operation that will be used is the checkout 753 command. An extension that can be added to the container is to use the branch 752 command before the mount to have one or more (or all) application containers see a private copy of the data. When the container is shutdown, the delete 755 command could be executed according to options chosen as part of the application container set up.

FIG. 12 illustrates an example of an application package 1280. It contains three applications 1281, 1282, 1283 and is not limited in numbers of applications. Each application would contain the dependencies that it needs such as binary libraries. The application 1281 could represent a virtual machine (VM) in which case it would also include an operating system as part of the virtual machine. The application package 1280 would also include a package engine 1287. This could be a script or a program that stays active even when the applications are executing. There is also configuration 1284 information which include settings and small bits of data 1286 along with the copy data tokens 1285. The package engine 1287 will read the configuration information 1284 and deploy the applications (for example, 1281, 1282 and 1283) contained in the package.

The package engine 1287 reads the configuration information and deploys each application. If an application has an associated copy data token 1285 as called out in the configuration settings 1286, then the package engine 1287 would execute the checkout 753 command to cause the data to be mounted for the application to use. Optionally, the package engine 1287 could execute a branch 752 command first which could allow multiple application packages 1280 to be deployed and each application would have its own private copy of the data.

An alternative to this could be to place the copy data tokens inside the application which will then configure its own access to data at time of execution.

Another exemplary use case is using copy data tokens to provide copies of production data for analytics. In this case, the copies are created as previously but the copy data tokens are kept in single file system folder. Each user has access to the copy data token folder and can copy a copy data token for their processing. Once they have the set of copy data tokens, they would execute the copy data token branch command to create their own private copy of the data, followed by an copy data token checkout command to make it accessible for use. Since each user will have their own private copy, they can write custom results and/or changes to the data. If they made a mistake, or want to try something else, they can easily do another copy data token branch command followed by a checkout command. When they are done, they can either do copy data token delete commands or ask the Administrator to capture the results of their work to promote to a primary copy for others to use. This creates a very efficient environment to do analytics and try things without effecting other users. It also lets a single user to try things and quickly undo any changes.

Figure 13:
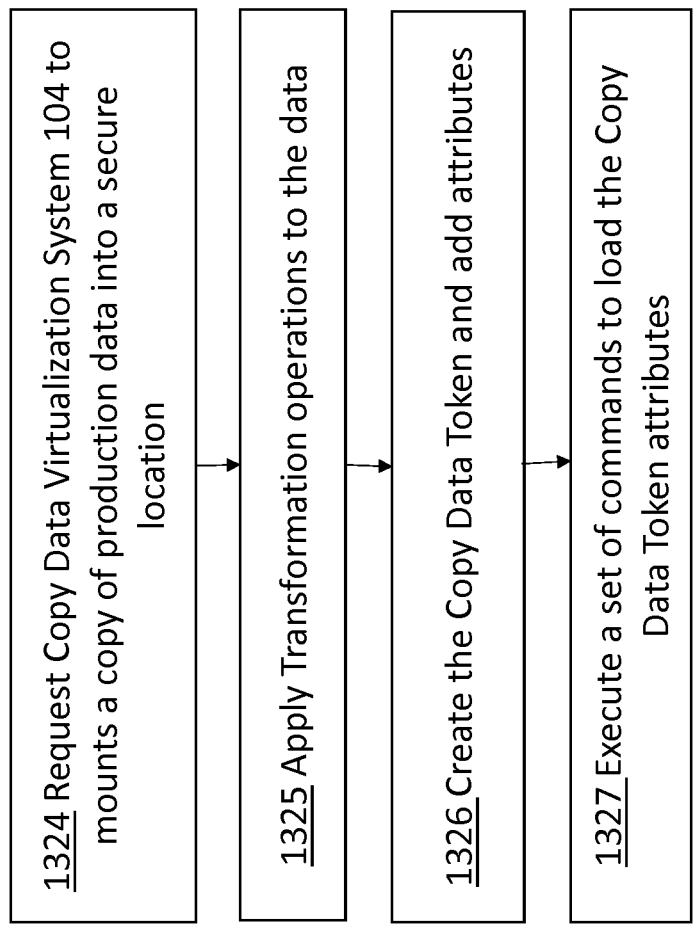
FIG. 13 is an exemplary computerized method for creating a copy data token for analytics, according to some embodiments.

FIG. 13 is an exemplary computerized method for creating a copy data token for analytics, according to some embodiments. FIG. 13 includes operation 1324 to mount a copy of the production data. When the operation is complete, this will become the primary copy of data, Operation 1325 to execute the transformation, operation 1326 to use the edit command and operation 1327 showing example edit commands.

FIG. 13 is an exemplary computerized logic flow of creating a copy data token for analytics environments. The first operation 1324 is to request the copy data virtualization system 104 to mount a copy of the production data 2001. The end goal is to create a primary copy of data 2005 that can then be used as the basis for working copy of data 2006, 2007 and 2008. Operation 1325 applies a set of transformation operations as has been already discussed. For example, Data Masking could be used with a goal of hiding real credit card numbers by replacing the numbers with fake ones. When the transformation operation 1325 is complete, the result becomes primary copy of data 2005 and the unique ID is saved by the copy data virtualization system 104 into the saved list of unique copy data ids 109. The next step, operation 1326 is to use the edit command as shown in FIG. 7 to create a copy data token 102 and add it attributes. Operation 1327 can include a set of copy data token edit commands (e.g., FIG. 7, edit command 750). The edit commands can include, for example:

edit -n primary_data_set -f Source "Data for company warehouse"

edit -n primary_data_set "Copy Data Address" "Unique_ID" 110 edit -n primary_data_set "Required Server Address" Server1 edit -n primary_data_set "Access Method" Block
edit -n primary_data_set "Access Protocol" iSCSI
edit -n primary_data_set "Read/Write" "Read/Write"

The edit commands shown will load the information into the attributes 417 in the copy data token 310.

In some embodiments, not all attributes must be specified and different implementations could have different defaults and different required attributes. At the end of the edit 750 commands in operation 1327 of FIG. 13, a copy data token 310 has been created with a single data set 312 called primary_data_set. It has a description in the source 319 attribute of "Data for company warehouse". It references copy data address 333 with Unique_ID 110 that was gotten at the end of operation 1325 in FIG. 13. Since there is no server information 328 and 329, the server would need to be specified by the end user or application using the copy data token 310 before causing a checkout 753 command to be executed. The copy data token has information that the primary copy 107 will be mounted using iSCSI as a block device in a read/write manner.

Figure 14:
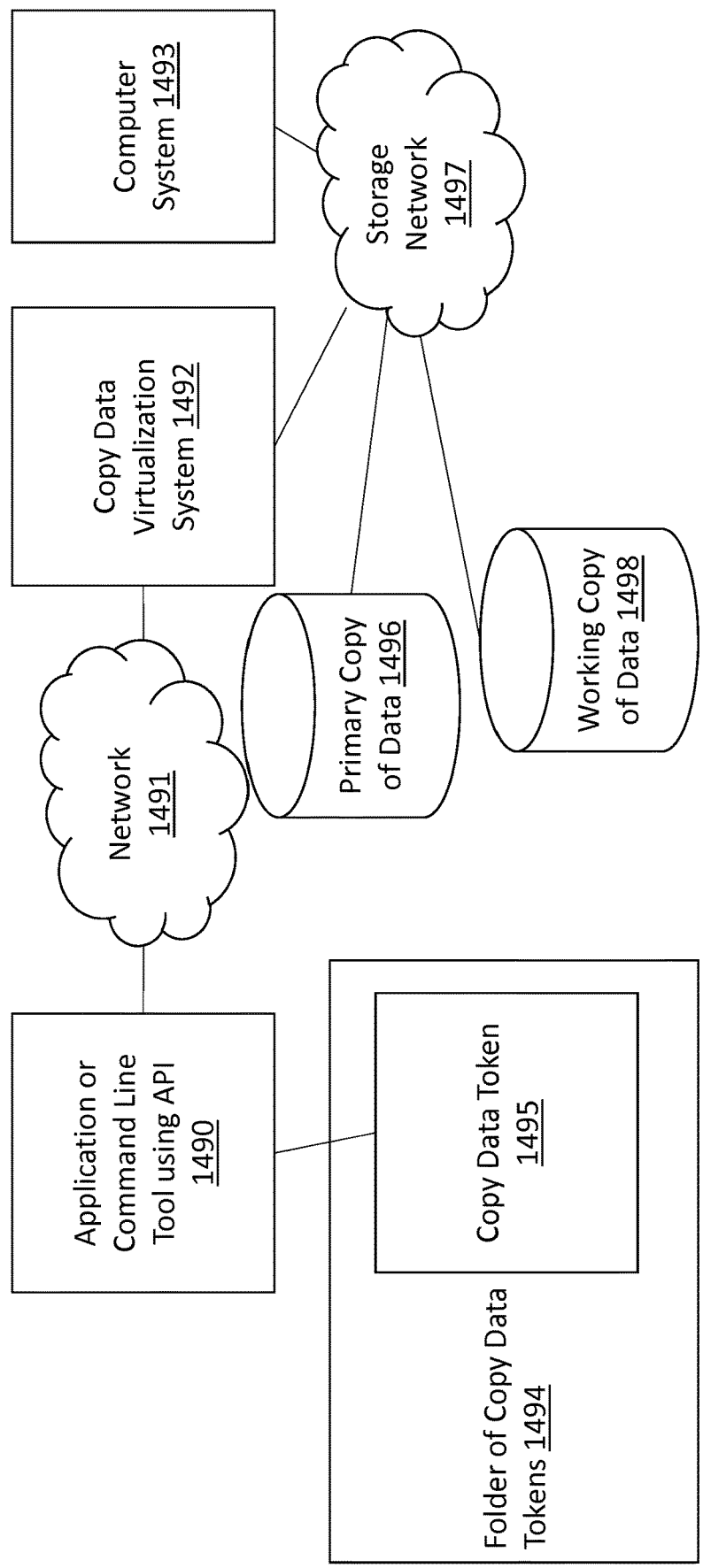
FIG. 14 is an exemplary system diagram for using copy data tokens for analytics, according to some embodiments.

FIG. 14 is an exemplary computerized method for using copy data tokens for analytics, according to some embodiments. FIG. 14 includes application or command line tool using API 1490, network 1491, copy data virtualization system 1492, computer system 1493, folder of copy data tokens 1494, copy data token 1495, primary copy of data 1496, working copy of data 1498 and storage network 1497. In some embodiments, the copy data token can be created using a JSON editor (e.g., if the copy data token was implemented as an JSON file).

Application or command line tool using API 1490 is any software that supports commands shown in FIG. 7 that can read a copy data token 1495 and communicate with a copy data virtualization system 1492. The copy data virtualization system 1492 is, for example, a copy data virtualization system as described in U.S. Pat. No. 8,417,674, entitled "System and Method for Creating Deduplicated Copies of Data by Sending Difference Information Between Near-Neighbor Temporal States," issued on Apr. 9, 2013. Network 1497 provides the ability for the application 1490 to communicate with copy data virtualization system 1492. The computer system 1493 has the capability to run software and connect to data. The folder of copy data tokens 1494 is part of the can exist on any storage device that provides a directory or folder structure and allows uses to access the copy data token files. Copy data token 1495 is of the type 310. Primary copy of data 1496 is an example of FIG. 20 primary copy of data 2005. Working copy of data 1498 is an example of working copy of data of FIG. 20 working copy of data 2006, 2007 and 2008. The storage network 1497 enables computers and software to connect with data.

An IT Administrator or DBAs would go through the process of creating copy data tokens for each of the data sources to be shared with the Analytics team. The set of copy data tokens 1495, in this example, are kept in a single folder. This could have any organization needed by the local group. A person working in Analytics will look through the copy data tokens available and select one or more. They would be copied to their local computer. They would then execute a checkout 753 command which would mount the primary copy 1496 through the storage network 1497 to the computer system 1493. As an option, they could have started with a branch 752 command to create a working copy 1498. This would allow them to make changes to the data and not affect any other users. When they were complete and if they wanted to keep the results, they could execute a checkin 754 command which would promote the working copy 1498 to a primary copy 1496.

Another exemplary use case for copy data tokens is for purchased research data. Many companies purchase research data from external sources or create research data to be used by other groups within the company. The problem they face is how to control the access, keep a log of activity and make sure no one can change the research data thereby affecting other people's research. By using copy data tokens to provide access to the data sources, the requirements are achieved. Each person will have a private copy of data so they can be free to modify it during the course of their research. When they have completed the research it will either be deleted manually or could expire automatically.

Figure 15:
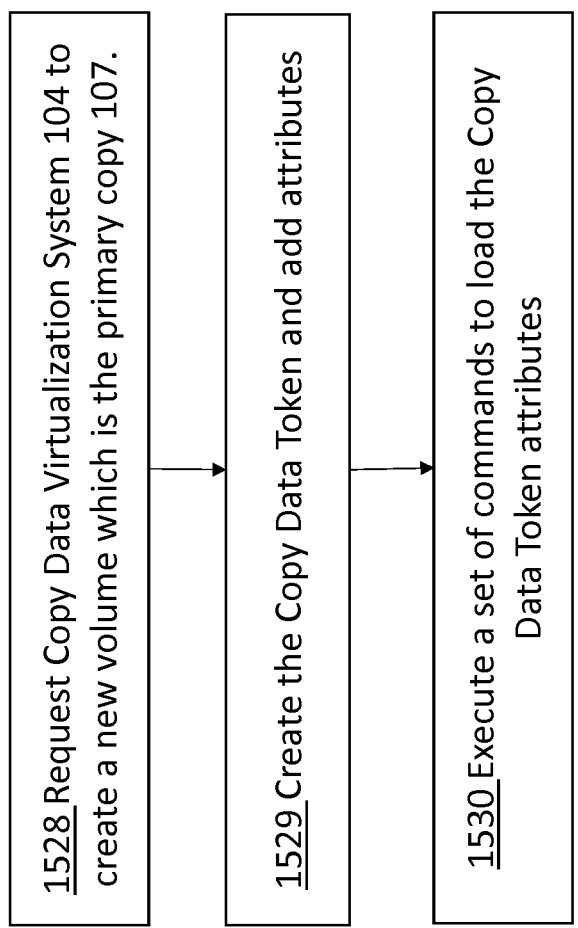
FIG. 15 is an exemplary computerized method for creating a copy data token for research data, according to some embodiments.

FIG. 15 is an exemplary computerized method for creating a copy data token for research data, according to some embodiments. FIG. 15 includes operation 1528 request to copy data virtualization system to create a new volume, operation 1529 to use the edit command to create a copy data token and operation 1530 with example edit commands to create the copy data token.

FIG. 15 is an exemplary computerized logic flow of creating a copy data token for research data environments. The first operation 1528 is to request the copy data virtualization system 104 to mount an empty volume similar to the production data 2001 except it does not contain any information. The end goal is to create a primary copy of data 2005 that can then be used as the basis for working copy of data 2006, 2007 and 2008. The research data is copied into the empty volume and when operation 1528 is complete, the result becomes primary copy of data 2005 and the unique ID is saved by the copy data virtualization system 104 into the saved list of unique copy data ids 109. The next step, operation 1529 is to use the edit command as shown in FIG. 7 to create a copy data token 102. Operation 1530 can include a set of copy data token edit commands (e.g., FIG. 7, edit command 750). The edit commands can load the information into the attributes 417 in the copy data token 310. The edit commands can include, for example:

Edit -n research_data -f Source "Research data for the research group"
edit -n research_data "Copy Data Address" "Unique_ID" 112
edit -n research_data "Required Server Address" Server1
edit -n research_data "Access Method" "File System"
edit -n research_data "Access Protocol" iSCSI
Edit -n research_data "Read/Write" "Read/Write"

In some embodiments, not all attributes must be specified and different implementations could have different defaults and different required attributes. At the end of the edit 750 commands in operation 1530 of FIG. 15, a copy data token 310 has been created with a single data set 312 called research_data. It has a description in the source 319 attribute of "Research data for the research group". It references copy data address 333 with Unique_ID 112 that was gotten at the end of operation 1528 in FIG. 15. Since there is no server information 328 and 329, the server would need to be specified by the end user or application using the copy data token 310 before causing a checkout 753 command to be executed. The copy data token has information that the primary copy 107 will be mounted using iSCSI as a file system in a read/write manner. In some embodiments, the copy data token can be created using a JSON editor (e.g., if the copy data token was implemented as an JSON file).

Figure 16:
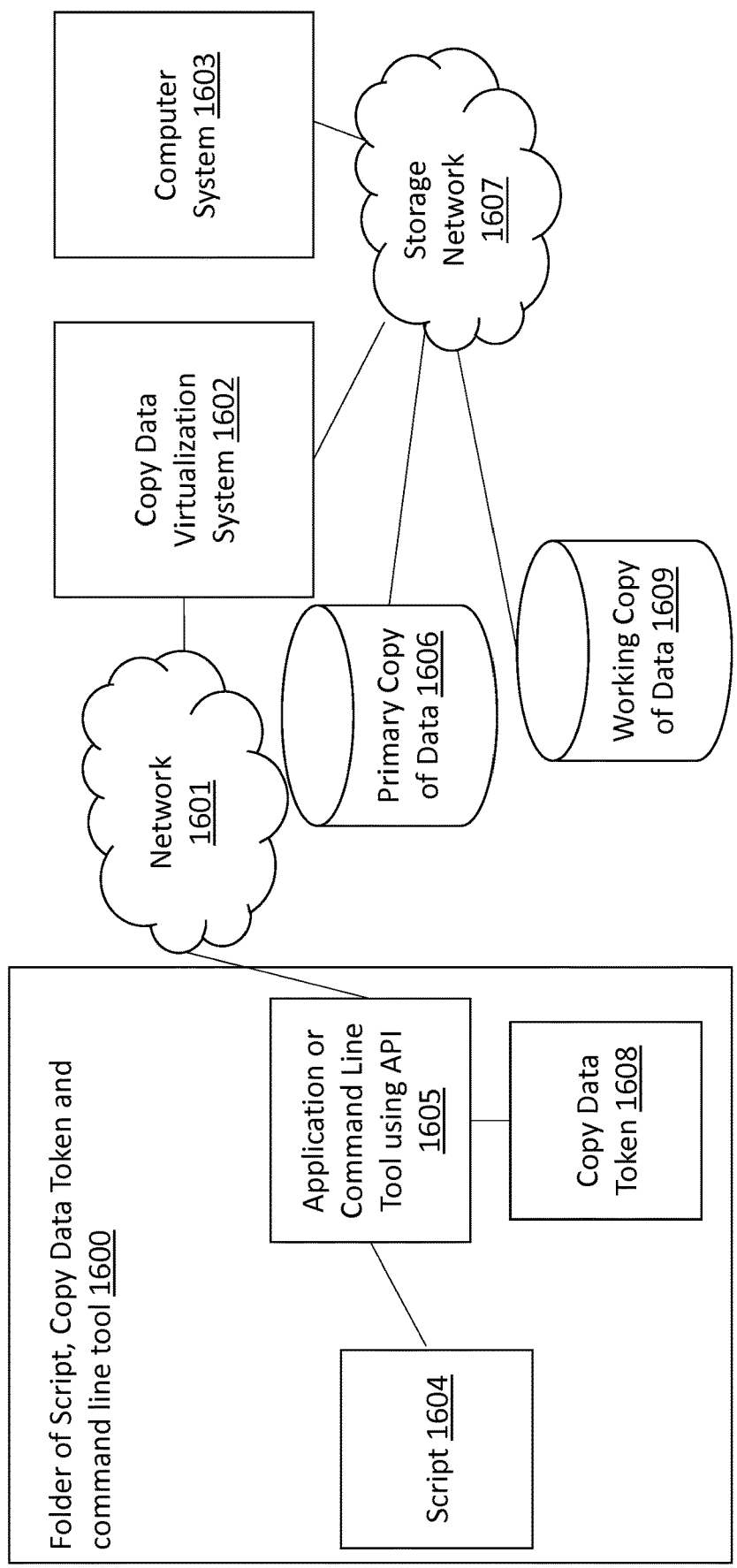
FIG. 16 is an exemplary computerized method for using copy data tokens for research data, according to some embodiments.

FIG. 16 is an exemplary computerized method for using copy data tokens for research data, according to some embodiments. FIG. 16 includes folder of script, copy data token and command line tool 1600, script 1604, application or command line tool using API 1605, copy data token 1608, network 1601, copy data virtualization system 1602, computer system 1603, primary copy of data 1606, working copy of data 1609 and storage network 1607.

Application or command line tool using api 1605 is any software that supports commands shown in FIG. 7 that can read a copy data token 1608 and communicate with a copy data virtualization system 1602. A folder of script, copy data token and command line tool 1600 can be provided by any file system that provides a directory or folder structure. The script 1604 can be implemented using any number of well-known scripting technologies such as Perl, Python, SH, Bash. It provide the execution of login taking a command line with arguments. The copy data token is of type copy data token 310 in FIG. 3. The copy data virtualization system 1602 is a copy data virtualization system as described in U.S. Pat. No. 8,417,674, entitled "System and Method for Creating Deduplicated Copies of Data by Sending Difference Information Between Near-Neighbor Temporal States," issued on Apr. 9, 2013. Network 1601 provides the ability for the application 1605 to communicate with copy data virtualization system 1602. The computer system 1603 has the capability to run software and connect to data. Primary copy of data 1606 is an example of FIG. 20 primary copy of data 2005. Working copy of data 1609 is an example of working copy of data of FIG. 20 working copy of data 2006, 2007 and 2008. The storage network 1607 enables computers and software to connect with data.

Each of the researchers are given a folder 1600 that contains a script 1604, a command line tool 1605 and a copy data token 1608. The script has two commands—start and stop. When the researcher executes the script with a command of start, it is executing the command line tool that executes a branch 752 command. This command is sent to the Copy Data Virtualization System 1602 over Network 1601. The Copy Data Virtualization System 1602 creates a working copy 1609 from the primary copy 1606. The next command in the script is a checkout 753 command. The command is communicated to the Copy Data Virtualization System 1602 which mounts the working copy 1609 to the computer system 1603 using storage network 1607. The researcher now has access to the research_data in a private copy. When they are done, they execute the script 1604 with a command of stop. The script executes a delete 755 command which is sent to the Copy Data virtualization System 1602. It dismounts the working copy 1609 and deletes it.

Another exemplary use case for copy data tokens is supporting problem re-creation environments. One of the issues that is faced in IT is when a problem occurs in the production environment. IT cannot execute debugging on the production environment while it is running One approach to solving this is to create a problem re-creation environment. This could be the pre-production staging area or a separate area. The goal is to have an environment that is identical (or as close as possible) to production and then try to re-create the problem. Once this is done, debugging to find the root cause can take place. The problem faced by IT is capturing the application and data as close as possible to point the problem occurred. If one tried to use the last night backup, the data may not be a state that would cause the problem. A Copy Data Virtualization system has the capabilities of capturing both the application and data at any point during the day so it can be used right after the problem is detected. Once the data sets are captured, one needs a method to pass them to another team to do problem re-creation and make sure they have the correct versions of things needed. A single copy data token could be created that contains references to the data needed for a consistent problem re-creation environment.

In some embodiments, copy data tokens provide access to data. Applications can be stored on a media as data and look the same as any other data. For example, there could be a copy data token that has two data sets it references. The first data set is the application and the second data set is the database needed by the application. Once the application and data have been captured, a copy data token can be created either automatically by the software or manually via the command line. This will capture the correct data sets and makes it very easy to communicate this to the problem re-creation team. They get the copy data token.

One of the exemplary benefits of the copy data token is that it provides the ability to snapshot the environment. This means the problem re-creation team can create a copy of the captured copy, get instant access to it, and do debugging. The team does not need to worry if the debugging will destroying any state or data because they can instantly get another fresh copy. Once the team think they understand the problem, they can create a fix and apply it another instant copy and try it. Once they have decided on the correct fix, it can be applied for a final test. At the end of the session, they still have the original captured application, state and data if it is needed again.

Figure 17:
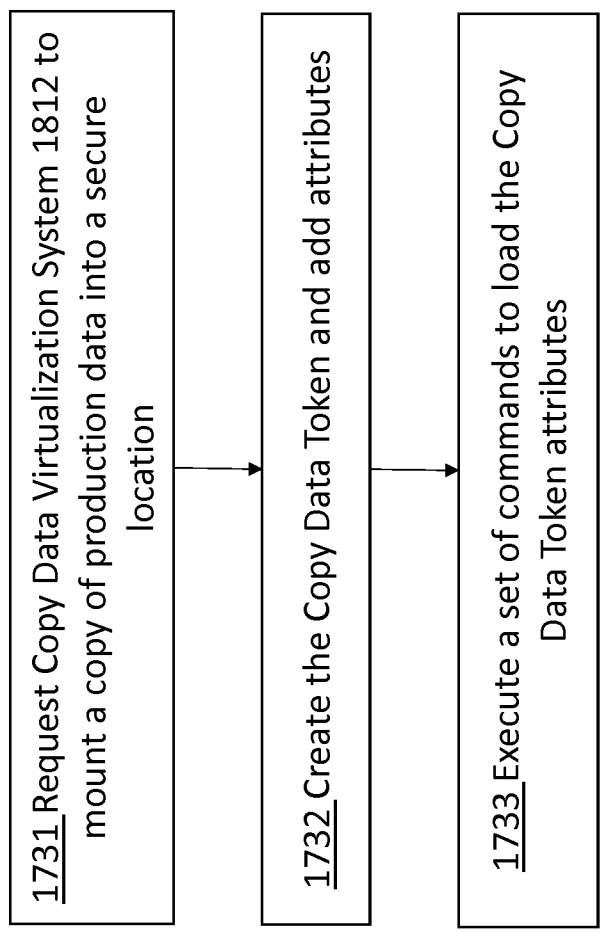
FIG. 17 is an exemplary computerized method of problem re-creation for a copy data token, according to some embodiments.

FIG. 17 is an exemplary computerized method of problem re-creation for a copy data token, according to some embodiments. FIG. 17 includes operation 1731 to mount a copy of production data which will become the primary data, operation 1732 to use edit command to create copy data token and operation 1733 to show example set of commands lines executed.

FIG. 17 is an exemplary computerized logic flow of creating a copy data token for problem re-creation environments. The first operation in FIG. 17, 1731 is to issue commands to the copy data virtualization system 1812 to take a copy of the production data 2001 which represented the production database and make a copy which becomes primary copy of data 1815. Another command is sent to the copy data virtualization system 1812 to take a copy of the production data 2001 which represented the production application and make a copy which becomes primary copy of data 1817.

Operation 1732 can include a set of copy data token edit 750 command to load specific attributes into the copy data token 1814. Operation 1733 represents an example of the edit command that can include, for example.

edit -n application -f Source "Billing Application"
    edit -n application "Copy Data Address" "Unique_ID" 200
    edit -n application "Access Method" File System
    edit -n application "Access Protocol" Fibre Channel
    edit -n application "Read/Write" "Read/Write"
    edit -n database Source "Billing Database"
    edit -n database "Copy Data Address" "Unique_ID" 201
    edit -n database "Access Method" Block
    edit -n database "Access Protocol" Fibre Channel
    edit -n database "Read/Write" "Read/Write"

In some embodiments, not all attributes must be specified and different implementations could have different defaults and different required attributes. At the end of the edit 750 commands in operation 1733 of FIG. 17, a copy data token has been created with two data sets 312 called application and database. The first references a copy data address 333 data with Unique_ID 1600 that was gotten at the end of operation 1731 in FIG. 17. This does not specify where the data will be mounted so it will need to be set before using the copy data token. The copy data token has information that the copy will be mounted using Fibre channel as a device and then mounted as a File System in a read/write manner. The second data set 312 is named database and has a Unique_ID 1601 that was gotten at the end of operation 1733 in FIG. e 17. This does not specify where the data will be mounted so it will need to be set before using the copy data token. The copy data token has information that the copy will be mounted using Fibre channel as an operating system device and then mounted as a File System in a read/write manner. In some embodiments, the copy data token can be created using a JSON editor (e.g., if the copy data token was implemented as an JSON file).

Figure 18:
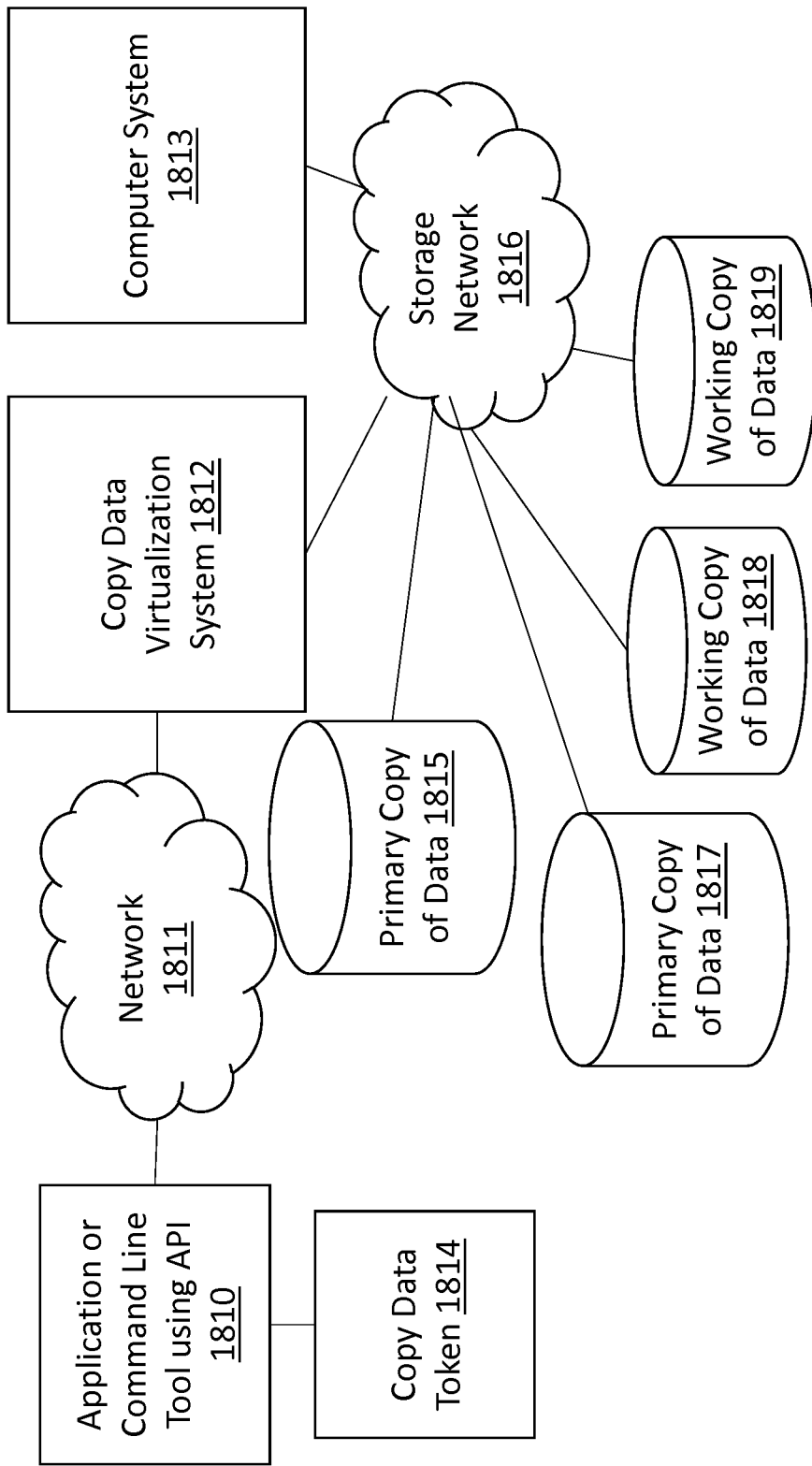
FIG. 18 is an exemplary system diagram for problem re-creation for a copy data token, according to some embodiments.

FIG. 18 is an exemplary system diagram for problem re-creation for a copy data token, according to some embodiments. FIG. 18 includes application or command line tool using API 1810, network 1811, copy data virtualization system 1812, computer system 1813, copy data token 1814, primary copy of data 1815, primary copy of data 1817, working copy of data 1818, working copy of data 1819, and storage network 1816.

Application or command line tool using api 1810 is any software that supports commands shown in FIG. 7 that can read a copy data token 1814 and communicate with a copy data virtualization system 1812. Copy data token 1814 is of the type 310 from FIG. 3. The copy data virtualization system 1812 is a copy data virtualization system as described in U.S. Pat. No. 8,417,674, entitled "System and Method for Creating Deduplicated Copies of Data by Sending Difference Information Between Near-Neighbor Temporal States," issued on Apr. 9, 2013. Network 1811 provides the ability for the application 1810 to communicate with copy data virtualization system 1812. The computer system 1813 has the capability to run software and connect to data. Primary copy of data 1815 and 1817 are examples of FIG. 20 primary copy of data 2005. Working copy of data 1818 and 1819 are examples of working copy of data of FIG. 20 working copy of data 2006, 2007 and 2008. The storage network 1816 enables computers and software to connect with data.

The problem re-creation team has been given a single copy data token 1814 which is small enough to be transferred as an attachment to an email. This copy data token 1814 represents the production environment of the application and its database. Before working with the data, the command line 1810 is used to execute an edit 750 command to set the server address 329 for each of the data sets 312 which specifies where the data would be mounted to. The command line 1810 is used to execute the branch 752 command which communicates the command to the Copy Data Virtualization System 1812 using Network 1811. The Copy Data Virtualization System 1812 will make a working copy of data 1818 from the primary copy 1815 and a working copy of data 1819 from the primary copy 1817. The command line 1810 next is used to execute the checkout 753 command which will cause the working copy 1818 and working copy 1819 to be mounted to the computer system 1813 using storage network 1816. The full environment is now available for problem re-creation work. When the work is complete, the command line 1810 will be used to send the delete 755 command to the Copy Data Virtualization System 1812 which will unmount and delete the working copy of data 1818 and working copy of data 1819.

Another exemplary use case of using copy data tokens is for cloud environments. Cloud environments are well known in the industry as locations for computer and storage that are remote to the company or organization location. This use case is an example of archiving in the cloud.

In some embodiments, a very efficient archive can be created using Copy Data Virtualization. In this case, a capture of the data can be done on a schedule (for example once a day) and the changes can be replicated to the cloud. The efficiency is created because although there can be data that represents one copy a day, only the changes are stored for each day and storage virtualization is used to create the specific copy as it is needed. Being an archive, it is important that no one can change the base data.

As each new copy is created, a new copy data token 310 is automatically created and named with date of creation. The user now has a library of tokens and can easily access the view of the data in the archive on any day that is needed. The user would be connected to the cloud environment. They would then use the command line or a special user interface that would display the available tokens. Once a token is selected, it would create a copy of the specific data and mount it to the specific server for access by the user. When they are done, they would delete the copy and the archive is still completely intact.

Figure 19:
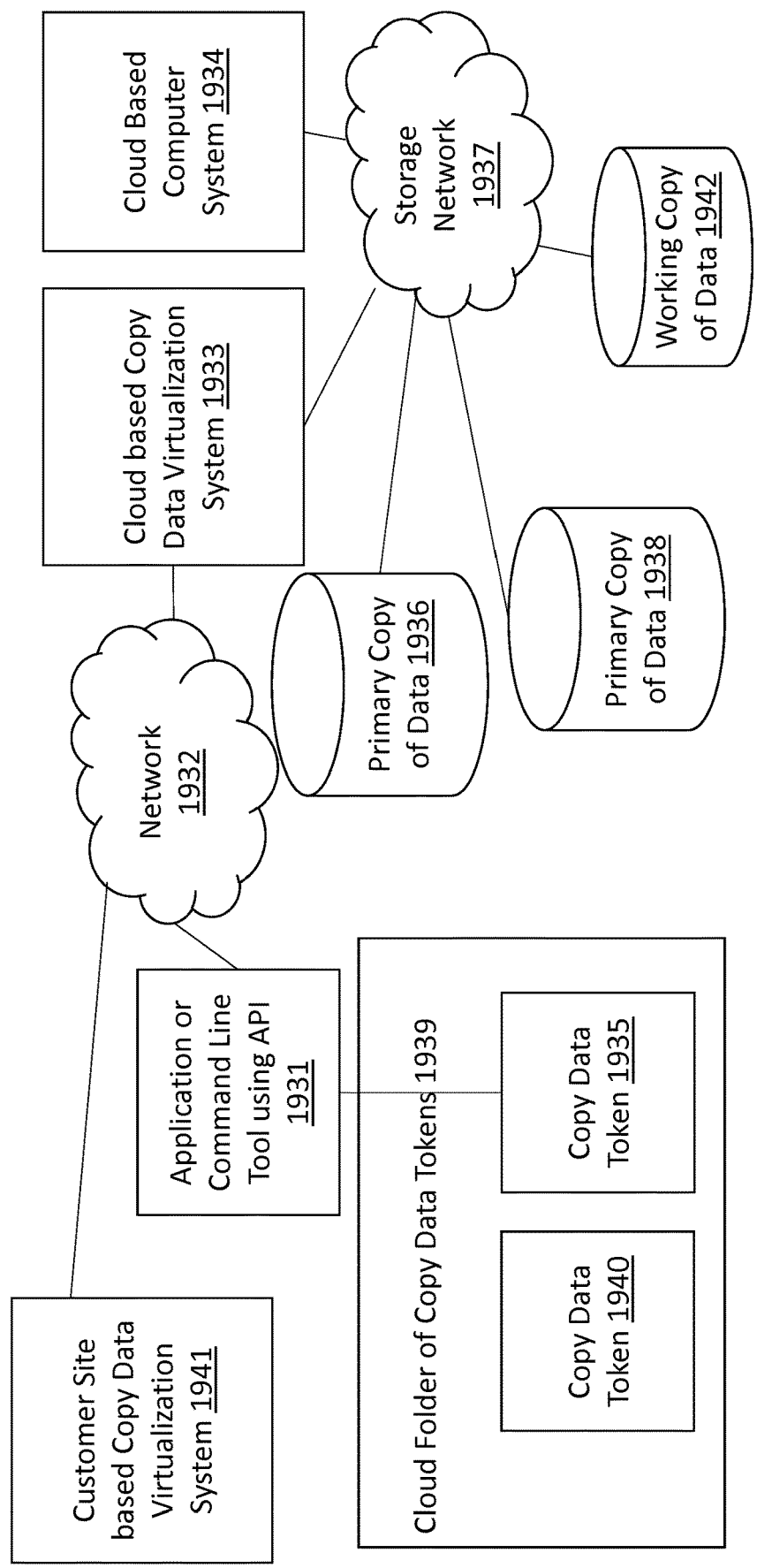
FIG. 19 is an exemplary system diagram for using copy data tokens for cloud archiving, according to some embodiments.

FIG. 19 is an exemplary system diagram for using copy data tokens for cloud archiving, according to some embodiments. FIG. 19 includes customer site based copy data virtualization system 1941, application or command line tool using API 1931, network 1932, cloud based copy data virtualization system 1933, cloud based computer system 1934, cloud folder of copy data tokens 1939, copy data token 1940, copy data token 1935, primary copy of data 1936, primary copy of data 1938, working copy of data 1942, storage network 1937.

Customer site based copy data virtualization system 1941 as described in U.S. Pat. No. 8,417,674, entitled "System and Method for Creating Deduplicated Copies of Data by Sending Difference Information Between Near-Neighbor Temporal States," issued on Apr. 9, 2013. IT communicated with cloud based copy data virtualization system 1933 to replicate copies of data from customer site to the cloud site. Application or command line tool using api 1931 is any software that supports commands shown in FIG. 7 that can read a copy data token 1940 and 1935 and communicate with a copy data virtualization system 1933. A cloud folder of copy data tokens 1940 and 1935 can be provided by any file system that provides a directory or folder structure. The copy data token is of type copy data token 310 in FIG. 3. The copy data virtualization system 1933 is a copy data virtualization system as described in U.S. Pat. No. 8,417,674, entitled "System and Method for Creating Deduplicated Copies of Data by Sending Difference Information Between Near-Neighbor Temporal States," issued on Apr. 9, 2013. Network 1932 provides the ability for the application 1931 and customer site based copy data virtualization system 1941 to communicate with copy data virtualization system 1933. The computer system 1934 has the capability to run software and connect to data. Primary copy of data 1936 and 1938 are examples of FIG. 20 primary copy of data 2005. Working copy of data 1942 is an example of working copy of data of FIG. 20 working copy of data 2006, 2007 and 2008. The storage network 1937 enables computers and software to connect with data.

On a daily basis, the customer site copy data virtualization System 1941 will capture changes from the customer environment and send them to cloud based copy data virtualization system 1933 which is then saved into primary copy 1936 on day 1 and primary copy 1938 on day 2 and so on. Each time the copy data virtualization system 1933 creates a primary copy 1936, it creates a matching copy data token 1940 and 1935. Over time, the cloud folder of copy data tokens 1939 will contain one copy data token for each day of archive data under management by the cloud based copy data virtualization system 1933. In FIG. 19, primary copy 1936 has an associated copy data token 1940 and primary copy 1938 has an associated copy data token 1935. The copy data tokens 1940 and 1935 are stored in a cloud folder 1939. When the user needs to gain access to the archived data in the cloud environment, they would connect to the cloud based computer system 1934 and execute the command line 1931, with the appropriate copy data token from the cloud folder of copy data tokens 1939, to send a branch 753 command to the cloud based copy data virtualization system 1933. This would cause the archived data stored in primary copy 1936 (for example) to be copied to the working copy of data 1942. The user would then execute a checkout 753 command which would mount the working copy of data 1942 to the cloud based computer system 1934 using the storage network 1937. They can access the archived data from the computer system. When they have completed the work, they would execute a delete 755 command to dismount and delete the working copy 1942.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computerized method for integrating a data token into a version control system, the data token defining attributes for copy data associated with the data token to facilitate the automatic management of the copy data for the version control system, the computerized method comprising:

executing, by a first computing device with a processor and memory, a first command associated with the version control system configured to store in the memory (a) a copy of source code associated with a source code repository from a remote repository, and (b) a copy of the data token from the remote repository, the remote repository being separate from the memory, the data token defining attributes associated with the copy data for use with the source code repository, the attributes comprising:
  source data for the copy data indicative of a data source location for the copy data; and
  mount data indicative of a second computing device to which the first computing device mounts the copy data for use by the second computing device, the data source location being located separate from the second computing device;

executing, by the first computing device, a second command associated with the version control system configured to create a version of the source code stored in the memory; and creating, by the first computing device, based on the execution of the second command a working copy of the copy data based on the data token for use with the version of the source code, comprising:
  creating a copy of the copy data from the data source based on the source data; and
  mounting the working copy to the second computing device based on the mount data, thereby automatically managing the copy data for the version control system.

2. The method of claim 1, wherein creating the working copy based on the execution of the second command comprises hooking into the second command, comprising:
  executing a branch command to create the working copy; and
  executing a checkout command to mount the working copy to the second computing device.

3. The method of claim 1, further comprising:
  executing a third command associated with the version control system configured to create a branch of the version of the source code;
  determining, based on execution of a fourth command associated with the branch, a second working copy of the copy data needs to be created for the branch of the version of the source code; and
  creating a second working copy of the copy data based on the data token for use with the branch of the version of the source code.

4. The method of claim 3, further comprising:
  determining, based on execution of a fourth command configured to create a second version of the source code stored in the memory, that the branch no longer exists in the version control system; and
  deleting the second working copy.

5. The method of claim 1, wherein creating a copy of the data token from the remote repository comprises:
  determining the first command is associated with a user from a first group of users of the version control system; and
  storing the data token because the data token is associated with the first group of users rather than a second data token associated with the second group of users.

6. The method of claim 1, wherein:
  the first command is a pull command; and
  the second command is a checkout command.

7. The method of claim 1, wherein:
  the attributes of the data token comprise transformation data for the copy data indicative of a set of modifications for the copy data when creating an instance of the copy data; and
  creating the working copy of the copy data comprises modifying the copy of the copy data based on the transformation data to generate the working copy.

8. A computerized apparatus for integrating a data token into a version control system, the data token defining attributes for copy data associated with the data token to facilitate the automatic management of the copy data for the version control system, the apparatus comprising a processor configured to run a module stored in memory that is configured to cause the processor to:
  execute a first command associated with the version control system configured to store in the memory (a) a copy of source code associated with a source code repository from a remote repository, and (b) a copy of the data token from the remote repository, the remote repository being separate from the memory, the data token defining attributes associated with the copy data for use with the source code repository, the attributes comprising:
    source data for the copy data indicative of a data source location for the copy data; and
    mount data indicative of a second computing device to which the computerized apparatus mounts the copy for use by the second computing device, the data source location being located separate from the second computing device;
  execute a second command associated with the version control system configured to create a version of the source code stored in the memory; and
  create based on the execution of the second command a working copy of the copy data based on the data token for use with the version of the source code, comprising:
    creating a copy of the copy data from the data source based on the source data; and
    mounting the working copy to the second computing device based on the mount data, thereby automatically managing the copy data for the version control system.

9. The computerized apparatus of claim 8, wherein creating the working copy based on the execution of the second command comprises hooking into the second command, comprising:
  executing a branch command to create the working copy; and
  executing a checkout command to mount the working copy to the second computing device.

10. The computerized apparatus of claim 8, wherein the module stored in memory is further configured to cause the processor to:
  execute a third command associated with the version control system configured to create a branch of the version of the source code;
  determine, based on execution of a fourth command associated with the branch, a second working copy of the copy data needs to be created for the branch of the version of the source code; and
  creating a second working copy of the copy data based on the data token for use with the branch of the version of the source code.

11. The computerized apparatus of claim 10, wherein the module stored in memory is further configured to cause the processor to:
  determine, based on execution of a fourth command configured to create a second version of the source code stored in the memory, that the branch no longer exists in the version control system; and
  delete the second working copy.

12. The computerized apparatus of claim 8, wherein creating a copy of the data token from the remote repository comprises:
  determining the first command is associated with a user from a first group of users of the version control system; and
  storing the data token because the data token is associated with the first group of users rather than a second data token associated with the second group of users.

13. The computerized apparatus of claim 8, wherein:
  the attributes of the data token comprise transformation data for the copy data indicative of a set of modifications for the copy data when creating an instance of the copy data; and
  creating the working copy of the copy data comprises modifying the copy of the copy data based on the transformation data to generate the working copy.

14. A non-transitory computer readable medium having executable instructions operable to cause an apparatus to:
   execute a first command associated with the version control system configured to store in the memory (a) a copy of source code associated with a source code repository from a remote repository, and (b) a copy of the data token from the remote repository, the remote repository being separate from the memory, the data token defining attributes associated with the copy data for use with the source code repository, the attributes comprising:
      source data for the copy data indicative of a data source location for the copy data; and
      mount data indicative of a second computing device to which the computerized apparatus mounts the copy data for use by the second computing device, the data source location being located separate from the second computing device;
   execute a second command associated with the version control system configured to create a version of the source code stored in the memory; and
   create based on the execution of the second command a working copy of the copy data based on the data token for use with the version of the source code, comprising:
      creating a copy of the copy data from the data source based on the source data; and
      mounting the working copy to the second computing device based on the mount data, thereby automatically managing the copy data for the version control system.

15. The non-transitory computer readable medium of claim 14, wherein creating the working copy based on the execution of the second command comprises hooking into the second command, comprising:
   executing a branch command to create the working copy; and
   executing a checkout command to mount the working copy to the second computing device.

16. The non-transitory computer readable medium of claim 14; wherein the executable instructions are operable to cause the apparatus to:
   execute a third command associated with the version control system configured to create a branch of the version of the source code;
   determine, based on execution of a fourth command associated with the branch, a second working copy of the copy data needs to be created for the branch of the version of the source code; and
   creating a second working copy of the copy data based on the data token for use with the branch of the version of the source code.

17. The non-transitory computer readable medium of claim 16, wherein the executable instructions are operable to cause the apparatus to:
   determine, based on execution of a fourth command configured to create a second version of the source code stored in the memory, that the branch no longer exists in the version control system; and
   delete the second working copy.

18. The non-transitory computer readable medium of claim 8, wherein creating a copy of the data token from the remote repository comprises:
   determining the first command is associated with a user from a first group of users of the version control system; and
   storing the data token because the data token is associated with the first group of users rather than a second data token associated with the second group of users.

19. The non-transitory computer readable medium of claim 14, wherein:
   the attributes of the data token comprise transformation data for the copy data indicative of a set of modifications for the copy data when creating an instance of the copy data; and
   creating the working copy of the copy data comprises modifying the copy of the copy data based on the transformation data to generate the working copy.

* * * * *